United States Patent
Ajayan et al.

(10) Patent No.: US 9,358,730 B2
(45) Date of Patent: Jun. 7, 2016

(54) DYNAMIC STRAIN HARDENING IN POLYMER NANOCOMPOSITES

(75) Inventors: Pulickel M. Ajayan, Houston, TX (US); Brent Joseph Carey, Blacklick, OH (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 799 days.

(21) Appl. No.: 13/531,188

(22) Filed: Jun. 22, 2012

(65) Prior Publication Data
US 2013/0069271 A1   Mar. 21, 2013

Related U.S. Application Data

(60) Provisional application No. 61/500,096, filed on Jun. 22, 2011.

(51) Int. Cl.
| | |
|---|---|
| B29C 71/00 | (2006.01) |
| B29C 70/00 | (2006.01) |
| B82Y 30/00 | (2011.01) |
| B29K 105/16 | (2006.01) |

(52) U.S. Cl.
CPC ............... *B29C 70/00* (2013.01); *B29C 71/00* (2013.01); *B29C 71/0072* (2013.01); *B29K 2105/167* (2013.01); *B82Y 30/00* (2013.01); *Y10S 977/75* (2013.01); *Y10S 977/752* (2013.01)

(58) Field of Classification Search
CPC .............. Y10S 977/742; Y10S 977/75; Y10S 977/752; Y10S 977/753; C01B 31/022; C01B 31/0253; C01B 31/0293; C01B 2202/00; B29C 71/0072; B29K 2105/167
See application file for complete search history.

(56) References Cited

PUBLICATIONS

Dannenberg, E.M., "Molecular slippage mechanism of reinforcement", Transactions of the Institution of the Rubber Industry, vol. 42, 1966, pp. 26-42.
Ci, L. et al., "Continuous Carbon Nanotube Reinforced Composites", Dept. of Mechanical Engineering and Materials Science, Rice University. Published on Web Aug. 5, 2008.
Zhang et al., Suppression of fatigue crack growth in carbon nanotube composites. Appl. Phys. Lett. 91, 193109-3 (2007).
Barber et al., Static and Dynamic Wetting Measurements of Single Carbon Nanotubes. Physical Review Letters 92 (18), 186103 (2004).
Dollase et al., Effect of Interfaces on the Crystallization Behavior of PDMS. Interface Science 11 (2), 199-209 (2003).
Coleman et al., Reinforcement of polymers with carbon nanotubes. The role of an ordered polymer interfacial region: Experiment and modeling. Polymer 47, 8556-8561 (2006).

(Continued)

*Primary Examiner* — Alison L Hindenlang
(74) *Attorney, Agent, or Firm* — Winstead PC

(57) ABSTRACT

The present invention provides methods of strengthening composites. In some embodiments, such methods generally comprise a step of applying a dynamic stress to the composite in order to increase at least one of the stiffness or strength of the composite. In some embodiments, the composite comprises: a polymer matrix; nanomaterial fillers; and an interphase between the polymer matrix and the nanomaterial fillers. In some embodiments, the stiffness or strength of the composite increases permanently in response to the applied stress. In some embodiments, the increase in the stiffness or strength of the composite may be associated with an increase in the storage modulus of the composite, a decrease in the loss modulus of the composite, and a decrease in the loss tangent of the composite. In some embodiments, the applied stress results in a rearrangement of the interphase.

42 Claims, 30 Drawing Sheets

(56) References Cited

PUBLICATIONS

Qu et al., Nanoscale Visualization and Multiscale Mechanical Implications of Bound Rubber Interphases in Rubber-Carbon Black Nanocomposites, Soft Matter, vol. 7, pp. 1066-1077, 2011.

Montes et al., Influence of the Glass Transition Temperature Gradient on the Nonlinear Viscoelastic Behavior in Reinforced Elastomers, Macromolecules, vol. 36, No. 21, pp. 8107?8118, 2003.

Khan et al., Polymer Crystallization in Nanocomposites: Spatial Reorganization of Nanoparticles, Macromolecules, vol. 42, No. 15, pp. 5741-5744, 2009.

Li et al., Nanohybrid Shish?Kebabs: Periodically Functionalized Carbon Nanotubes, Advanced Materials, vol. 17, No. 9, pp. 1198-1202, 2005.

Litvinov et al., Rubber-Filler Interactions and Network Structure in Relation to Stress-Strain Behavior of Vulcanized, Carbon Black Filled EPDM. Macromolecules 44, 4887-4900 (2011).

Coleman et al., Small but Strong: A Review of the Mechanical Properties of Carbon Nanotube-Polymer Composites. Carbon 44, 1624-1652 (2006).

Wetzel et al., Epoxy Nanocomposites Fracture and Toughening Mechanisms. Eng. Fract. Mech. 2006, 73, 2375-2398.

Aliev et al., Giant-Stroke, Superelastic Carbon Nanotube Aerogel Muscles. Science 2009, 323, 1575-1578.

Cadek et al., Morphological and Mechanical Properties of Carbon-Nanotube-Reinforced Semicrystalline and Amorphous Polymer Composites. Appl. Phys. Lett. 2002, 81, 5123-5125.

Hou et al., Functionalized Few-Walled Carbon Nanotubes for Mechanical Reinforcement of Polymeric Composites. ACS Nano 2009, 3, 1057-1062.

Moniruzzaman et al., Polymer Nanocomposites Containing Carbon Nanotubes. Macromolecules 2006, 39, 5194-5205.

Podsiadlo et al., Ultrastrong and Stiff Layered Polymer Nanocomposites. Science 2007, 318, 80-83.

Chen et al., Vertically-Aligned Carbon Nanotubes Infiltrated with Temperature-Responsive Polymers: Smart Nanocomposite Films for Self-Cleaning and Controlled Release. Chem. Commun. 2008, 163.

Wei et al., Structural Ordering in Nanotube Polymer Composites. Nano Lett. 2004, 4, 1949-1952.

a b c d a b c d a b a b a b c d

DYNAMIC STRAIN HARDENING IN POLYMER NANOCOMPOSITES

CROSS-REFERENCE TO RELATED APPLICATIONS

This application claims priority to U.S. Provisional Patent Application No. 61/500,096, filed on Jun. 22, 2011. The entirety of the above-identified provisional application is incorporated herein by reference.

STATEMENT REGARDING FEDERALLY SPONSORED RESEARCH

This invention was made with government support under Grant No. NNX09AK10H, awarded by the National Aeronautics and Space Administration. The government has certain rights in the invention.

BACKGROUND

Current methods of developing composites with enhanced stiffness or strength have numerous limitations. For instance, many methods lack the ability to produce composites with a permanent increase in stiffness or strength. Current methods may also lack the ability to produce composites that are capable of responding and adapting to applied loads. Therefore, a need exists for improved methods of developing composites with enhanced stiffness or strength.

BRIEF SUMMARY

In some embodiments, the present disclosure provides methods of stiffening or strengthening a composite. In some embodiments, such methods generally comprise a step of applying a stress to the composite in order to increase the stiffness or strength of the composite. In some embodiments, the composite comprises: a polymer matrix; a nanomaterial filler; and an interphase between the polymer matrix (e.g., bulk polymer matrix) and the nanomaterial filler. In some embodiments, the nanomaterial fillers are non-covalently associated with the polymer matrix.

In some embodiments, the stiffness or strength of the composite increases by about 5% to about 30% in response to the applied stress. In some embodiments, the stiffness or strength of the composite continues to increase after the stress is reapplied to the composite. In some embodiments, the stiffness or strength of the composite increases permanently in response to the applied stress. In some embodiments, the relaxation modulus of the composite remains substantially the same after the applying of the stress to the composite. In some embodiments, the increase in the stiffness or strength of the composite may be associated with an increase in the storage modulus of the composite, a decrease in the loss modulus of the composite, and a decrease in the loss tangent of the composite.

In some embodiments, the applied stress results in a rearrangement of the interphase region surrounding the nanomaterial filler. In some embodiments, the rearrangement of the interphase comprises a realignment of the polymer matrix at the interphase. In some embodiments, the rearrangement of the interphase comprises a reduction or elimination of the interphase.

In some embodiments, the applied stress is at least one of mechanical stress, dynamic stress, static stress, cyclical stress, stress axial to the alignment direction of nanomaterial fillers, stress radial to the alignment direction of nanomaterial fillers, normal stress, vibrational stress, compressive stress, tensile stress, shear stress, flexural stress (e.g., three-point bending), uniaxial stress, biaxial stress, triaxial stress, torsional stress, and combinations thereof. In some embodiments, the applied stress comprises dynamic stress.

The methods of the present disclosure may be applied to various composites, such as composites that comprise a natural or synthetic polymer matrix. In some embodiments, the polymer matrix of the composites is at least one of crystalline polymers, semi-crystalline polymers, amorphous polymers, epoxies, elastomeric polymers, (e.g., silicone elastomers), polyethylenes, polyacrylates, polyesters, polyurethanes, polyvinyls, polyacrylamides, nylons, polystyrenes, polybutadienes, polypropylenes, polyimides, synthetic rubbers, natural rubbers, and combinations thereof. In some embodiments, the polymer matrix comprises elastomeric polymers, such as poly(dimethylsiloxane), other polysiloxanes, synthetic rubbers, natural rubbers, and combinations thereof.

In some embodiments, the nanomaterial fillers of the composites include at least one of single-walled carbon nanotubes, multi-walled carbon nanotubes, double-walled carbon nanotubes, triple-walled carbon nanotubes, few-walled carbon nanotubes, ultra-short carbon nanotubes, graphite, carbon black, nanofibers, nanoparticles, and combinations thereof. In some embodiments, the nanomaterial fillers comprise multi-walled carbon nanotubes.

The methods of the present disclosure can produce composites with various advantageous properties. For instance, in some embodiments, the methods of the present disclosure can produce composites with enhanced thermal expansion and enhanced rates of crystallization. The methods of the present disclosure may also be used to make composites for various applications, such as use in artificial connective tissues that can adapt to applied loads.

BRIEF DESCRIPTION OF THE FIGURES

FIG. 1D shows a scanning electron microscope (SEM) image of a composite sample.

As shown in FIG. 6A, stiffening still occurs at low frequencies, as well as low strains and high frequencies to some extent. This observation indicates the flexibility of the stiffening with regard to the parameters of dynamic stressing, and the suboptimal performance at high frequencies is most likely due to the high elasticity inherent to rapid compression. FIG. 6B shows that composites reinforced with randomly-aligned CNTs at the same nanotube loading also display the strengthening behavior.

FIG. 7A provides data indicating that there is no significant change in the neat polymer, and there is a heightened improvement when the composite is stressed transverse to the CNT alignment direction. This observation suggests that interfacial pressure promotes the stiffening. FIG. 7B provides data from a stress relaxation testing for a displacement similar to what is endured during the dynamic tests. No improvement was observed, thereby indicating that dynamic stress is significant in initiating the change. To observe the effects that static stress and recovery have on the stiffening, a single sample was subjected to 3 bouts of 1 MPa static stress each followed by a dynamic test using the same static load with the addition of a 5% strain amplitude. As shown in FIG. 7C, there is an apparent retention of stiffness between tests, and while there is some temporary relaxation between dynamic tests, it quickly resumes the previous trend. The amplitude of that relaxation appears to diminish over extended testing, suggesting that there is a transition from temporary to permanent improvement. There is also clearly no contribution due to the static tests, confirming that this is a cumulative response that is exclusive to dynamic stressing.

As illustrated in FIG. 17A, there may be regions in a composite where the nanotubes are pushed into bundles during the crystallization process. As illustrated in FIG. 17B, the presence of an entangled bound rubber on the nanotube surfaces may prevent intimate contact in the unstressed composite. For the case of the stiffened composite, however, the lack of an immobile polymer buffer at the interface could allow for tight bundles, explaining the orthogonal boost to both the small, and wide angle x-ray scattering (FIG. 17C).

DETAILED DESCRIPTION

Figure 1:
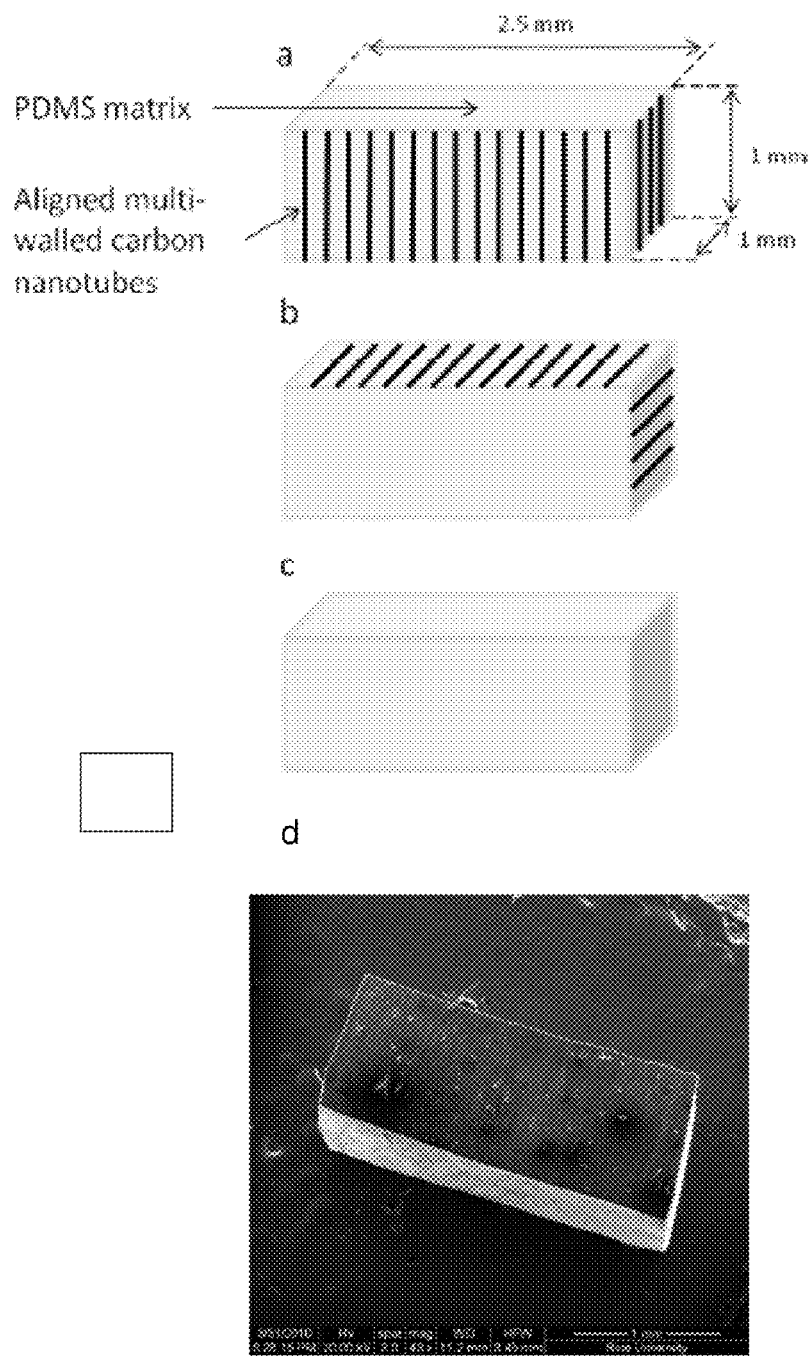
FIG. 1 shows a schematic of the fatigue characterization of composite samples containing poly(dimethylsiloxane) (PDMS) and carbon nanotubes (CNTs) (PDMS/CNT composites). Orientation-specific fatigue responses were resolved by cyclically compressing the resulting composites along the axial (longitudinal, FIG. 1A) or radial (transverse, FIG. 1B) direction of CNT alignment and were compared to a neat PDMS control (FIG. 1C).

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. For instance, reference to an "increase in stiffness or strength" can refer to an increase in stiffness, an increase in strength, or an increase in stiffness and strength. Also, terms such as "element" or "component" encompass both elements or components comprising one unit and elements or components that comprise more than one unit, unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Current methods of developing composites with enhanced stiffness have numerous limitations. For instance, many methods lack the ability to produce composites with a permanent increase in stiffness or strength. Such methods may also lack the ability to produce composites that are capable of responding and adapting to applied loads. Therefore, a need exists for improved methods of developing composites with enhanced stiffness or strength for many applications. The present invention aims to address this need.

In some embodiments, the present disclosure provides methods of stiffening or strengthening various composites. Such methods generally include a step of applying a stress to the composite. In some embodiments, the applied stress increases the stiffness or strength of the composite. Additional embodiments of the present disclosure pertain to the composites produced or affected by such methods.

As set forth in more detail herein, various types of stresses may be applied to various types of composites. Furthermore, the stiffness or strength of the composites may increase in accordance with various parameters.

Composites

The methods of the present disclosure can be applied to various composites. In some embodiments, the composites may include a polymer matrix and a nanomaterial filler. In some embodiments, the composites may also contain an interphase region between the polymer matrix and the nanomaterial fillers. As set forth in more detail herein, various polymer matrices and nanomaterial fillers may be utilized in the composites of the present disclosure.

Polymer Matrix

In the present disclosure, a polymer matrix generally refers to an assembly or network of one or more polymers. The composites of the present disclosure may contain various polymer matrices. In some embodiments, polymer matrices of the present disclosure may contain linear polymers, branched polymers, cross-linked polymers, homopolymers, copolymers (e.g. alternating copolymers, periodic copolymers, random copolymers, block copolymers, grafted copolymers), liquid crystalline polymers, liquid crystalline elastomers, thermosetting polymers, thermoplastic polymers, thermoplastic elastomers, resins, and combinations thereof. In some embodiments, the polymer matrices of the present disclosure may include at least one of crystalline polymers, semi-crystalline polymers, amorphous polymers, natural polymers, synthetic polymers, synthetic rubbers, natural rubbers, epoxies, elatomeric polymers (e.g., silicone elastomers), polyethylenes, polyacrylates, polyesters, polyurethanes, polyvinyls, polyacrylamides, nylons, polystyrenes, polypropylenes, polyimides, polybutadienes, and combinations thereof.

In some embodiments, the polymer matrices of the present disclosure may include elastomeric polymers. Suitable elastomeric polymers may include, without limitation, polysiloxanes, polyisoprenes (e.g., cis-1,4-polyisoprene and trans-1,4-polyisoprene), polybutadienes, polychloropenes, butyl rubbers (e.g.; copolymers of isobutylene and isoprene), halogenated butyl rubbers (e.g., chloro butyl rubber and bromo butyl rubber), ethylene propylene rubbers (e.g. ethylene propylene diene rubber), polystyrenes, fluoroelastomers, nitrile rubbers (e.g. hydrogenated nitrile rubber), and combinations thereof.

In some embodiments, the polymer matrices of the present disclosure may include organosilicons, including polysiloxanes, such as poly(dimethylsiloxane) (PDMS). In some embodiments, the polymer matrices of the present disclosure may include PDMS.

In some embodiments, the polymer matrices of the present disclosure may include at least one of poly(methyl methacrylate), poly(N-isopropylacrylamide), polyethylene, butadiene styrene (ABS), ethylene-vinyl acetate (EVA), ethylene vinyl alcohol (EVAL), polyacetal (POM), polyacrylonitrile (PAN), polyamide (PA), polyamide-imide (PAD), polyaryletherketone (PAEK), polybutadiene (PBD), polybutylene (PB), polybutylene terephthalate (PBT), polyethylene terephthalate (PET), polycyclohexylene dimethylene terephthalate (PCT), polycarbonate (PC), polyhydroxyalkanoates (PHAs), polyketone (PK), polyester, polyetheretherketone (PEEK), polyetherimide (PEI), polyethersulfone (PES), polyethylenechlorinates (PEC), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polyurethane (PU), polyvinyl chloride (PVC), polyvinylidene chloride (PVDC), and combinations thereof. Additional suitable polymers are disclosed in "Physical Properties of Polymers Handbook" (2nd ed., 2007, ISBN 978-0-387-31235-4) and incorporated herein by reference.

In addition, the polymers of the present disclosure can have various structures and properties. For instance, in some embodiments, the polymers may have molecular structures or thermal transition properties that would allow them to change conformation in the presence of nanomaterial fillers and applied stress.

In some embodiments, the polymers may have interatomic bond angle(s) or bond length(s) in their backbone that would allow for a sufficiently low persistence length. In some embodiments, the persistence length of the polymers may be from about 5 nm to about 10 µm. In some embodiments, the persistence length of the polymers may be from about 5 nm to about 500 nm. Without being bound by theory, it is envisioned that a low persistence length of polymers can enable localized translation or reptation of the polymer chains.

In some embodiments, the phase transition temperature(s) of the polymers (e.g., glass transition temperature (a transition) or melting transition(s) ($T_m$)) may be different or apart from a desired operational temperature of the composite. For instance, in some embodiments, the phase transition temperature(s) of the polymers may be from about 20° C. to about 150° C. lower or higher than the operational temperature of the composites. In some embodiments, the operational temperature of the composites may be from about 20° C. to about 37° C. In some embodiments, the phase transition temperature(s) of the polymers may be at a temperature where the composite will be subjected to dynamic stress. Such embodiments may ensure that the polymer or polymer composite is not glassy or fluid.

In some embodiments, the polymers of the present disclosure may be arranged such that any side-chains or other moieties on the surfaces of the polymer backbone would not obstruct or otherwise inhibit fluidity in the polymer matrix. In some embodiments, the polymers of the present disclosure may have structures and morphologies (including distinct mesophases) that would not impede or otherwise obstruct the strain-induced evolution of the polymer's morphology in the presence of nanomaterial fillers. In some embodiments, the polymers may be processed such that it prevents the formation of crystalline structures or entanglements in the polymer network that would obstruct or otherwise inhibit the relative translation of the polymer chains.

In some embodiments, such as in the case of vulcanizates, the cross-link density of the polymers may be controlled to allow for interphasic viscoplasticity during applied stressing. For instance, in some embodiments, the cross-link density of the polymers may be sufficiently low as to allow for the evolution of the interphase, yet sufficiently high as to inhibit a relaxation of the evolved morphology of the polymer network.

Nanomaterial Fillers

The composites of the present disclosure may also include various nanomaterial fillers. In some embodiments, the nanomaterial fillers may include, without limitation, single-walled carbon nanotubes (SWNTs), multi-walled carbon nanotubes (MWNTs), double-walled carbon nanotubes (DWNTs), triple-walled carbon nanotubes (TWNTs), few-walled carbon nanotubes (FWNTs), ultra-short carbon nanotubes, graphite, graphene, graphene nanoribbons, carbon black, silica nanoparticles, metal nanoparticles, metal nanofibers, ceramic nanoparticles, ceramic nanofibers, organometallic nanoparticles, organometallic nanofibers, cermet nanoparticles, cermet nanofibers, and combinations thereof. In some embodiments, the nanomaterial fillers may include carbon nanotubes, such as MWNTs. In some embodiments, the nanomaterial fillers may include diamond, amorphous carbon, buckminister fullerenes, glassy carbon, atomic or diatomic carbon, carbon nanofoams, lonsdaleite, linear acetylenic carbon, chaoite, nanofibers, nanoparticles, and combinations thereof.

The nanomaterial fillers of the present disclosure may also be in various forms. For instance, in some embodiments, the nanomaterial fillers of the present disclosure may be in pristine form. In some embodiments, the nanomaterial fillers of the present disclosure may be covalently or non-covalently functionalized with various functional groups. In some embodiments, the nanomaterial fillers of the present disclosure may be un-functionalized.

In some embodiments, the nanomaterial fillers of the present disclosure may have crystal structures. In some embodiments, the nanomaterial fillers of the present disclosure may have defects in their crystal structures. In some embodiments, the crystal structure defects may include, without limitation, vacancy defects, interstitial defects, frenkel defects, substitutional defects, antisite defects, topological defects, line defects, planar defects, bulk defects, and combinations thereof.

In some embodiments, the nanomaterial fillers of the present disclosure may include at least one of pristine carbon nanotubes, functionalized carbon nanotubes, un-functionalized carbon nanotubes, and combinations thereof. In some embodiments, the nanomaterial fillers of the present disclosure may include carbon nanotubes that have been covalently or non-covalently functionalized with various functional groups, such as alkenes, alcohols, amines, carboxylic acids, amides, thiols, and combinations thereof.

The nanomaterial fillers of the present disclosure may have various lengths, widths and thicknesses. In some embodiments, the nanomaterial fillers of the present disclosure may have lengths, widths and thicknesses that range from about 1 nm to about 200 nm in each direction. In some embodiments, the nanomaterial fillers of the present disclosure may have lengths, widths and thicknesses that range from about 100 nm to about 200 nm in each direction.

Additional Fillers

The composites of the present disclosure may also include one or more additional fillers. Non-limiting examples of additional fillers may include, without limitation, surfactants, plasticizers, metal particles, ceramic particles, cermet particles, organometallic particles, rigid polymer particles, and combinations thereof.

Interphase

In some embodiments, the composites of the present disclosure may also have an interphase region between the polymer matrix and the nanomaterial fillers. As set forth in more detail herein, the interphase region of composites may undergo various rearrangements in response to applied stress. Such structural changes can in turn influence the stiffness or strength of composites.

Arrangements

The composites of the present disclosure may have various arrangements. For instance, in some embodiments, the nanomaterial fillers in the composites may be non-covalently associated with the polymer matrix. In some embodiments, the non-covalent association may include at least one of chemisorption, physisorption, dipole interactions, van der Waals forces, and combinations thereof.

In some embodiments, the nanomaterial fillers in the composites may be covalently associated with the polymer matrix. In some embodiments, the nanomaterial fillers in the composites may be covalently and non-covalently associated with the polymer matrix.

In various embodiments, the nanomaterial fillers of the present disclosure may be uniformly dispersed, scattered, or aligned within a composite. In some embodiments, the nanomaterial fillers of the present disclosure may include at least one of aggregates, agglomerates, bundles, ropes, strands, and combinations thereof. In some embodiments, the nanomaterial fillers of the present disclosure may be horizontally aligned, vertically aligned, or randomly aligned. In some embodiments, the nanomaterial fillers of the present disclosure may be vertically aligned. In some embodiments, the nanomaterial fillers of the present disclosure may be horizontally aligned. In some embodiments, the nanomaterial fillers of the present disclosure may be vertically aligned and horizontally aligned.

The composites of the present disclosure may also be in various states. In some embodiments, the composites of the present disclosure may be fully cured. In some embodiments, the composites of the present disclosure may be un-cured. In some embodiments, the composites of the present disclosure may be partially cured. In some embodiments, the composites of the present disclosure may be isotropic. In some embodiments, the composites of the present disclosure may be anisotropic.

The composites of the present disclosure may also have various shapes and sizes. In some embodiments, the composites of the present disclosure may be rectangular, circular, cylindrical, square-like, or trapezoidal. In some embodiments, the composites of the present disclosure may have lengths, widths and thicknesses that range from about 10 nm to about 2 cm in each direction. In some embodiments, the composites of the present disclosure may have lengths, widths and thicknesses that range from about 500 nm to about 5 mm in each direction. In more specific embodiments, the composites of the present disclosure may be 2.5 mm long, 1 mm wide, and 1 mm thick. Additional suitable composite sizes can also be envisioned.

Applied Stress

In the present disclosure, an applied stress generally refers to one or more forces that act on a composite. Various types of stresses may be applied to composites. In some embodiments, the applied stress may include at least one of mechanical stress, dynamic stress, static stress, cyclical stress, stress axial to the alignment direction of nanomaterial fillers, stress radial to the alignment direction of nanomaterial fillers, normal stress, vibrational stress, compressive stress, tensile stress, shear stress, flexural stress (e.g., three-point bending), uniaxial stress, biaxial stress, triaxial stress, torsional stress, and combinations thereof.

In some embodiments, the applied stress may include dynamic stress. Dynamic stress generally refers to an applied stress involving a repeating load. In some embodiments, the repeating load may be a regular repeating load. In some embodiments, the repeating load may be an irregular repeating load. In some embodiments, the dynamic stress may be sinusoidal, triangular, square-like, or vibrational (e.g. random oscillation or irregular oscillation). In some embodiments, the dynamic stress may be cyclical. In some embodiments, the dynamic stress may be intermittent. In some embodiments, the dynamic stress may have a regular period or amplitude. In some embodiments, the dynamic stress may have an irregular period or amplitude.

In some embodiments, a stress may be applied to composites as a single event. In some embodiments, the stress may be applied to composites as a cyclical event that repeats itself. In some embodiments, the applied stress may include from about 100 cycles to about 1,000,000 cycles. In some embodiments, the applied stress may include about 500,000 cycles. In some embodiments, the applied stress may include several million cycles.

In various embodiments, the stress may be applied to composites for various periods of time. For instance, in some embodiments, the applied stress may last anywhere from a few milliseconds to several days. In some embodiments, a stress may be applied to a composite for about 3.5 days.

Moreover, the stress may be applied to composites in various manners. For instance, in some embodiments, the stress may be applied to composites axially (i.e., longitudinally). In some embodiments, the stress may be applied to composites radially (i.e., transverse). In some embodiments, the stress may be applied to composites axially and radially.

In some embodiments, the stress may be applied to composites along the axial or radial directions of nanomaterial filler alignment. In more specific embodiments, a stress may be applied to composites along the axial direction of carbon nanotube alignment. In some embodiments, a stress may be applied to composites along the radial direction of carbon nanotube alignment.

Increase in Composite Stiffness or Strength

In some embodiments, the stress applied to the composites of the present disclosure may increase the stiffness (i.e., modulus) of the composite. In some embodiments, the stress applied to the composites of the present disclosure may increase the strength of the composite. In some embodiments, the stress applied to the composites of the present disclosure may increase the stiffness and strength of the composite.

For instance, in some embodiments, the stress applied to the composites of the present disclosure can increase the stiffness or strength of the composite from about 5% to about 4,000%. In some embodiments, the stress applied to the composites of the present disclosure can increase the stiffness or strength of the composite from about 5% to about 30%, or from about 5% to about 15%. In some embodiments, the increase in the stiffness of the composites may be measured as kN/m.

In some embodiments, the stress applied to the composites of the present disclosure can increase the strength of the composite, such as compressive strength, tensile strength, shear strength, and combinations thereof. In some embodiments, the increase in composite strength can be characterized as units of pressure (e.g., Pa, psi, or $N/m^2$).

In some embodiments, the increase in the stiffness or strength of the composite due to the applied stress may be permanent. For instance, in some embodiments, the stiffness or strength measured after applied stress may not return to the initial level. In some embodiments, the increase in stiffness or strength may be cumulative for repeated instances of dynamic stress. In some embodiments, the modulus measured through compressive loading, tensile loading, shear loading, torsional loading, and combinations of such loadings may be greater after the material has been subjected to dynamic stress. In some embodiments, the relaxation modulus of the composites may remain substantially the same after the applying of the stress to the composite (e.g., a decrease or increase of less than about 1 MPa).

In some embodiments, the increase in the stiffness or strength of the composites due to the applied stress may be temporary. In some embodiments, the stiffness or strength may decrease slightly at the offset of dynamic stress. In some embodiments, the stiffness or strength of the composites may continue to increase after dynamic stress is reapplied to the composite. In some embodiments, the stiffness or strength of the composites may remain substantially the same after the applying of the stress to the composite.

In some embodiments, the increase in the stiffness or strength of the composites may be associated with an increase in the storage modulus of the composites, such as an increase of about 5% to about 10%. In some embodiments, the increase in the stiffness or strength of the composites may be associated with a decrease in the loss modulus of the composites, such as decrease of about 5% to about 10%. In some embodiments, the increase in the stiffness or strength of the composites may be associated with a decrease in the loss tangent (i.e., damping, as measured by Tangent δ) of the composites. In some embodiments, the increase in the stiffness or strength of the composites may be associated with an increase in the storage modulus of the composites, a decrease in the loss modulus of the composites, and a decrease in the loss tangent of the composites.

Mechanistic Aspects of Composite Stiffening or Strengthening

Without being bound by theory or mechanism, it is envisioned that the composites of the present disclosure can develop increased stiffness or strength in response to an applied stress by undergoing various structural changes. For instance, in some embodiments, the applied stress may result in a realignment or rearrangement of the polymer matrix in the composite. In some embodiments, the polymer matrix may become disentangled in response to the applied stress. In some embodiments, the polymer matrix may rearrange or realign near the interphase region of the composites.

In some embodiments, the applied stress may lead to the reptation of polymer chains within a polymer matrix. In some embodiments, the reptation of the polymer chains in the polymer matrix can increase the stiffness or strength of the composites.

In some embodiments, the applied stress may result in a realignment or rearrangement of the nanomaterial fillers in the composite. For instance, in some embodiments, the applied stress may result in an aggregation of the nanomaterial fillers. In some embodiments, the applied stress may result in the bundling of the nanomaterial fillers. In some embodiments, the applied stress may result in the disaggregation of the nanomaterial fillers. In some embodiments, the applied stress may result in the debundling or reorientation of the nanomaterial fillers.

In some embodiments, the applied stress may result in a rearrangement of the interphase region between the nanomaterial fillers and the polymer matrix. For instance, in some embodiments, the rearrangement of the interphase may include a realignment of the polymer matrix near the interphase. In some embodiments, the applied stress may result in a collective orientation of the polymer matrix near the interphase. In some embodiments, the applied stress may result in a reduction or elimination of the interphase region. In some embodiments, the applied stress may result in the consolidation of polymer entanglements on the nanomaterial fillers.

In some embodiments, the applied stress may lead to the slippage of polymer chains along the surface of the nanomaterial fillers, as characterized by E. M. Dannenberg et al. (Transactions of the Institution of the Rubber Industry, 1966 (42):26-42). Without being bound by theory, it is envisioned that, in the absence of covalent bonding between the nanomaterial fillers and the polymer matrix, the inelastic slip of polymer chains along the surface of the nanomaterial fillers during applied stress can result in the homogenization of interparticle chain lengths of polymers within the polymer matrix. In some embodiments, the homogenization of interparticle chain length of polymers within the polymer matrix may result in a more even distribution of the applied stress (e.g., applied dynamic stress) within the composite.

Applications and Advantages

The methods of the present disclosure can produce composites with various advantageous properties. For instance, in some embodiments, the methods of the present disclosure can produce composites with an enhanced rate of crystallization. In some embodiments, the composites may begin crystallizing immediately upon being introduced to the temperature range where crystallization can occur. In some embodiments, the methods of the present disclosure can produce composites that reach crystal saturation in approximately half the time when compared to the polymer matrix or the unstressed composite.

In some embodiments, the methods of the present disclosure can produce composites that have an enhanced rate of crystallization. For instance, in some embodiments, the methods of the present disclosure can produce composites with enhanced rates of crystallization that range from about 10% to about 200% when compared to unstressed composites. In some embodiments, the methods of the present disclosure can produce composites with enhanced rates of crystallization that range from about 10% to about 50% when compared to unstressed composites.

In some embodiments, the methods of the present disclosure may also produce composites with enhanced thermal properties. For instance, in some embodiments, the composites may increase in thermal expansion by about 10% to about 50%. In some embodiments, the composites may increase in thermal stability by about 10° C. to about 100° C.

Furthermore, the methods of the present disclosure may be used to make composites for various applications. For instance, the methods of the present disclosure may be used to make materials that can selectively stiffen or strengthen where stressed. In some embodiments, the methods of the present disclosure may be used to make composites for adaptable structural materials, such as artificial connective tissues that can adapt to applied loads. In some embodiments, the methods of the present disclosure could be used for improved engineering of load transfer in polymer nanocomposites and the understanding of new modes of polymer/nanoparticle interactions in nanoscale hybrid materials. In some embodiments, the methods of the present disclosure could be used to develop materials to adaptively protect the joining surfaces of rigid members. In some embodiments, the methods of the present disclosure could be used to give surfaces a protective surface that can adapt to loading or impact.

Additional Embodiments

Reference will now be made to more specific embodiments of the present disclosure and experimental results that provide support for such embodiments. However, Applicants note that the disclosure below is for exemplary purposes only and is not intended to limit the scope of the claimed invention in any way.

Example 1

Observation of Dynamic Strain Hardening in Polymer Nanocomposites

Most materials, when subjected to repeated mechanical stress, will undergo irreversible microstructural damage, which can lead to cracking, delamination, or other failure at stress levels below what they could previously bear. The additions of nanoscale ceramic particles, carbon nanotubes (CNTs), and even phase-separated poly(dimethyl-siloxane) (PDMS) healing agents have yielded polymer composites with suppressed crack pinning, suppressed micro-crack propagation, and self-healing. Such findings have focused on passively improving the resilience to dynamic loads above the fatigue limit (the minimum stress necessary to induce fatigue-related failure). However, materials are sometimes reinforced or otherwise "strengthened" in order to improve their resiliency to repeated loading.

The act of strengthening through deformation can be typically based on preparatory measures and plastic deformation of materials to alter their microstructures. Such deformation can in turn alter the bulk properties of the materials. Strain hardening is a technique used predominantly in metallurgy where a greater density of dislocations (defects) are generated in the crystal structure through repeated plastic deformation. This mechanism results in a stronger material that resists further deformation. Alternatively, some biomechanical tissues in vivo can actively strengthen by adapting to the loads they are repeatedly subjected to. For example, regular elastic stress on bones will stimulate a localized increase in bone density, a response mechanism commonly referred to as Wolff's law, which reduces the risk of fracture in areas of frequent loading.

CNTs have recently been shown to be capable of biomimetic actuation. In a response strikingly similar to what occurs in bones, Applicants report in this Example the observation of dynamic-stress-induced mechanical stiffening in CNT/PDMS nanocomposites. This behavior is a unique and not-yet-observed phenomenon similar in premise to strain hardening that, in contrast, occurs during repeated elastic deformation. The effect leads to a significant increase in stiffness and storage modulus, with no apparent limit after one week (3.5 million cycles) of continuous stressing. The stiffness improvement appears to be stifled (but not eliminated) by further heat treatment, implying that, while the level of polymer cross-linking may play a role, another mechanism may be occurring. Analysis of the sub-ambient cold crystallization behavior of this material shows not only that nanotubes seed crystallinity in this polymer (an observation in support of recent work with other semi-crystalline polymers) but that the dynamically stressed sample begins crystallizing almost immediately upon introduction to the temperature range where crystallization may occur. Such enhanced crystallinity was not observed in unstressed composites or neat polymers.

Several groups have recently reported that the efficiency of interfacial load transfer may depend on CNT/polymer chemistry and adhesion. Likewise, it has been hypothesized that the manner in which the matrix is interacting with interstitials (such as CNTs) can play a significant role in the level of improvement of load transfer. While a conclusive mechanism for the stiffness increase is not yet entirely clear, Applicants' observations suggest that, in the presence of CNTs, the morphology of a rubbery polymer evolves and becomes more ordered during repeated elastic stressing, thereby improving mechanical interaction with the CNTs and, in turn, the bulk properties of the composite.

Example 1A

Preparation of Nanocomposites

Nanocomposite specimens were cut into rectangular blocks approximately 2.5 mm long, 1 mm wide, and 1 mm thick. See FIG. 1. Vertically aligned forests of MWNTs (FIG. 2) were grown by a vapor-phase chemical vapor deposition process using ferrocene and xylene precursors. See Andrews et al. Chem. Phys. Lett. 1999 (303): 467-474.

PDMS, a silicone elastomer, has a high affinity for the surface of CNTs. PDMS was used to impregnate the as-grown MWNT forests using the previously reported infiltration procedure, a process that has also been used with other polymer matrices such as epoxy, poly(methyl methacrylate), and poly (N-isopropylacrylamide). Applicants previously reported that these vertically aligned CNT/PDMS nanocomposites exhibit a clear anisotropy as well as impressive strength and damping, as compared to the neat polymer. Through the monotonic loading and low-cycle hysteresis behavior of this material, respectively, a 6-fold improvement in the modulus and up to a 21-fold increase in damping was observed.

Example 1B

Dynamic Mechanical Analysis of the Nanocomposites

Figure 3:
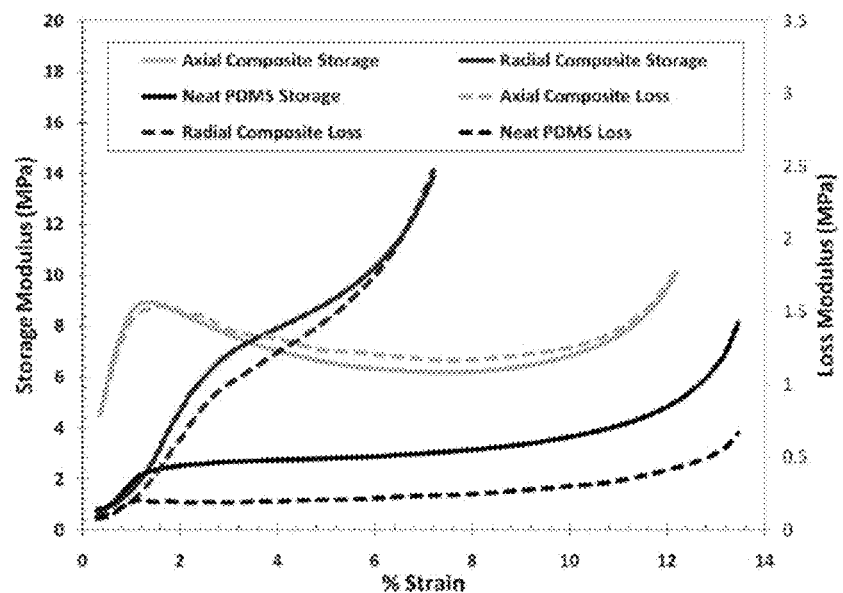
FIG. 3 shows fundamental viscoelastic analysis of the PDMS/CNT composites. For the strain-dependent testing, axial testing more closely mimics the CNTs, while the radial testing responds in a similar fashion to the neat PDMS (FIG. 3A). Both composites show much greater damping due to the high interfacial surface area (FIG. 3B). The axial composite shows a much higher storage and loss (FIG. 3C). All samples share a similar baseline, and the distinct peaks are most likely attributed to resonance in the direction of CNT alignment (FIG. 3D).
Figure 3:
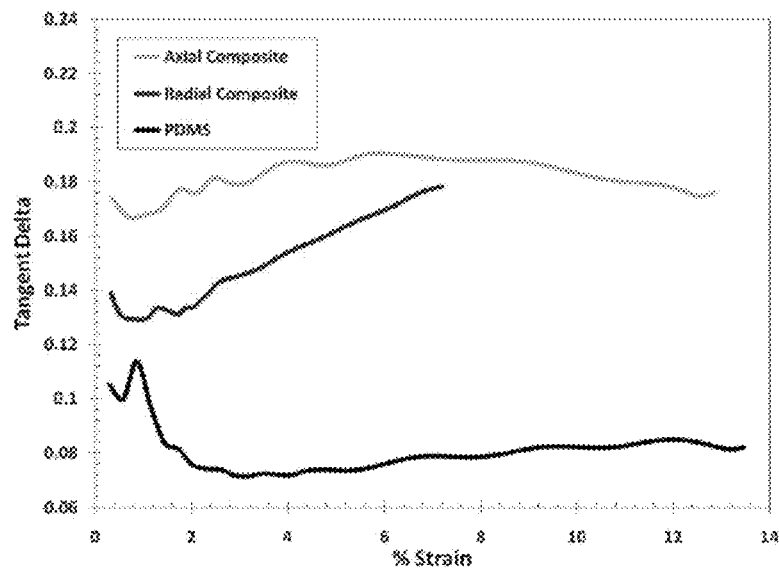
Figure 3:
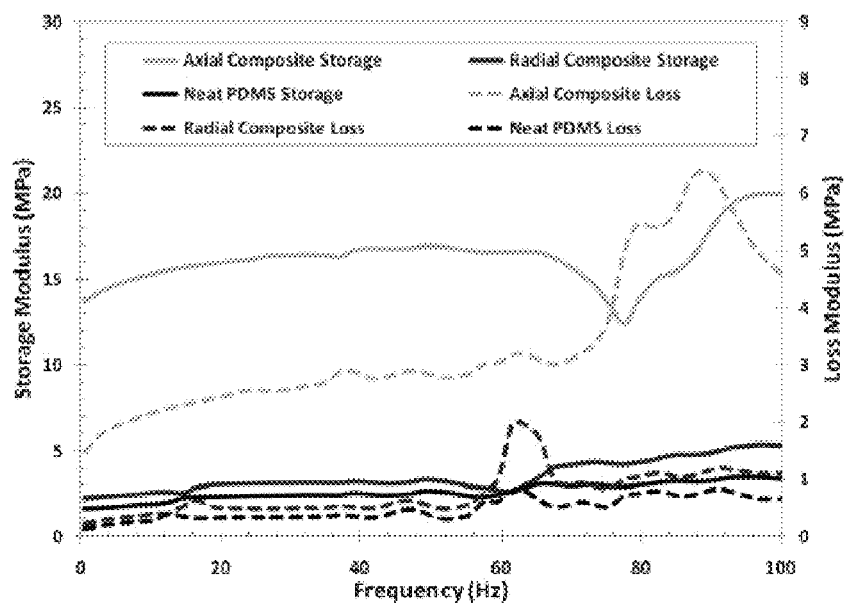
Figure 3:
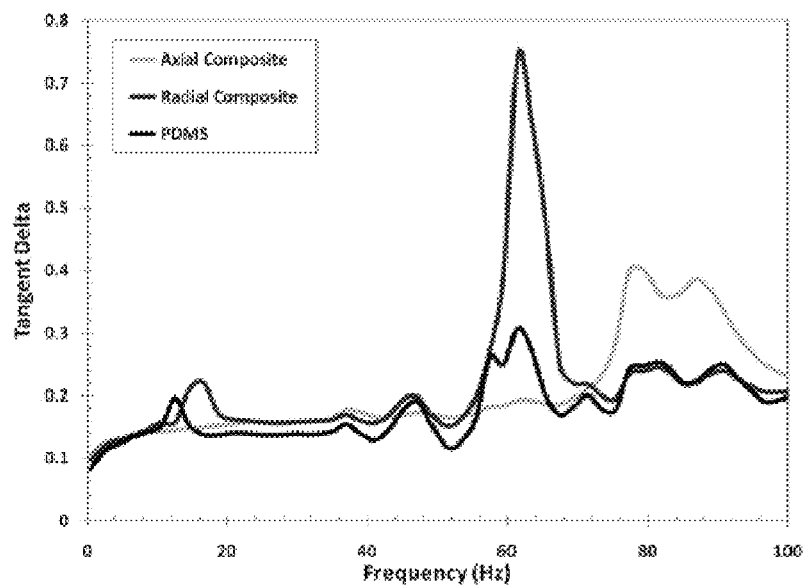

With both aligned forests of CNTs and polymer-infiltrated CNT composites having been shown to display viscoelastic behavior, dynamic mechanical analysis (DMA) is an ideal tool, as it can be used to track the evolution of stiffness and viscoelastic properties, such as the storage (E') and loss (E") moduli and damping (tan $\delta$) with great precision during dynamic stressing. Fundamental viscoelastic analysis of these composites is provided in FIG. 3.

Figure 4:
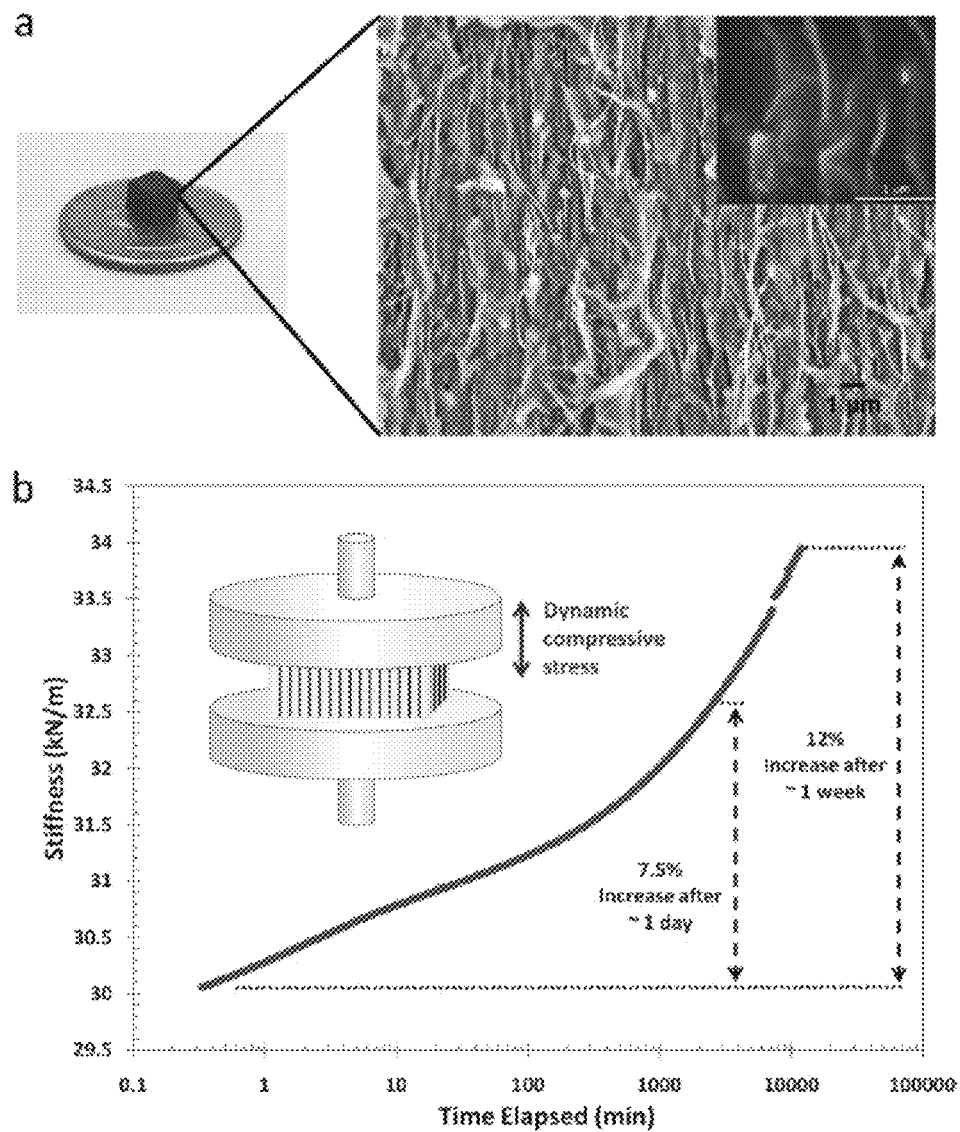
FIG. 4 provides evidence of dynamic stiffening in PDMS/CNT composites. Continuously reinforced nanocomposites were prepared by infiltrating freestanding CNT forests with PDMS and curing in situ (FIG. 4A). Discernable stiffening was observed for the composite during cyclic compressive stressing (inset, FIG. 4B), a phenomenon not observed for the neat polymer. This behavior continued even after one week and a total number of 3.5 million cycles, and the trend showed no apparent saturation or ceiling (the breaks in the test are a result of restarted tests due to furnace errors with the instrument). This stiffening was also observed in randomly aligned CNT composites prepared two years ago, suggesting that it is not exclusive to vertically aligned CNTs or fresh composites.

By using DMA to subject the material to high-cycle loading, FIGS. 4A-B illustrate the stiffening phenomenon that occurs during dynamic compressive testing. Compared to the neat polymer (which shows no significant change), Applicants observe up to a 7.5% improvement in the stiffness after one day of dynamic stressing. After one week (3.5 million cycles) of continuous dynamic stress and a 12% increase in stiffness, there is still no observable ceiling to this behavior, indicating that there is potential for even greater improvement.

The anisotropy of these samples allows for two distinct responses based on the orientation of the sample during deformation. By comparing these orientations for identical testing conditions in FIG. 5A, Applicants observe a 5.9% increase in stiffness when tested radially (transverse to CNT alignment) as compared to a 4.3% improvement axially (longitudinal to CNT alignment). The disparity in improvement suggests that, due to the mechanics of the deformation in the radial testing mode, nanotube/polymer interfacial pressure may play a role in explaining the behavior.

Figure 5:
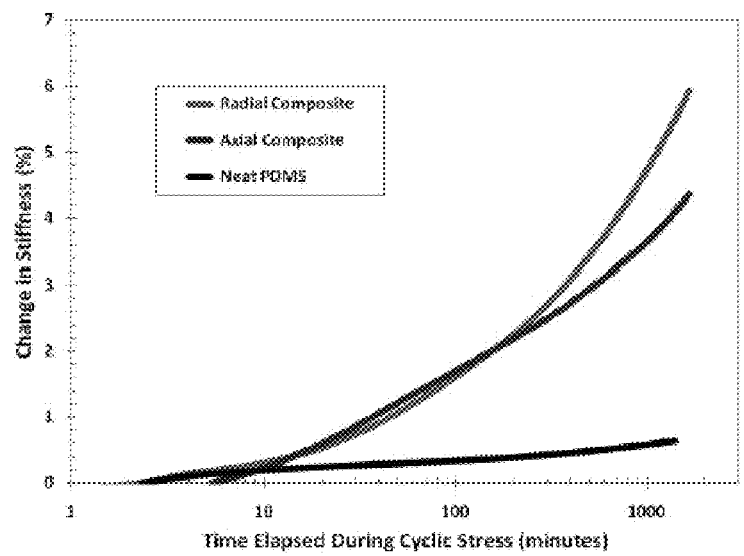
FIG. 5 provides a comparison of radial and axial composite stiffening to the neat polymer. The stiffness (FIG. 5A) and storage modulus (FIG. 5B) increase for the composites during dynamic stress, while the loss modulus (FIG. 5C) and the tan delta (FIG. 5D) decay slightly. The radial composites see a slightly higher improvement (5.9% transverse/radial vs. 4.3% longitudinal/axial), while there is no significant change for neat PDMS.
Figure 5:
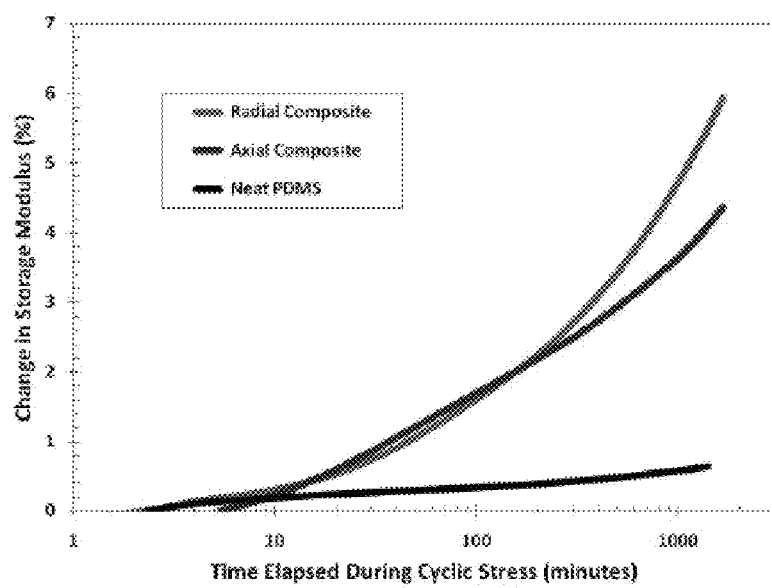
Figure 5:
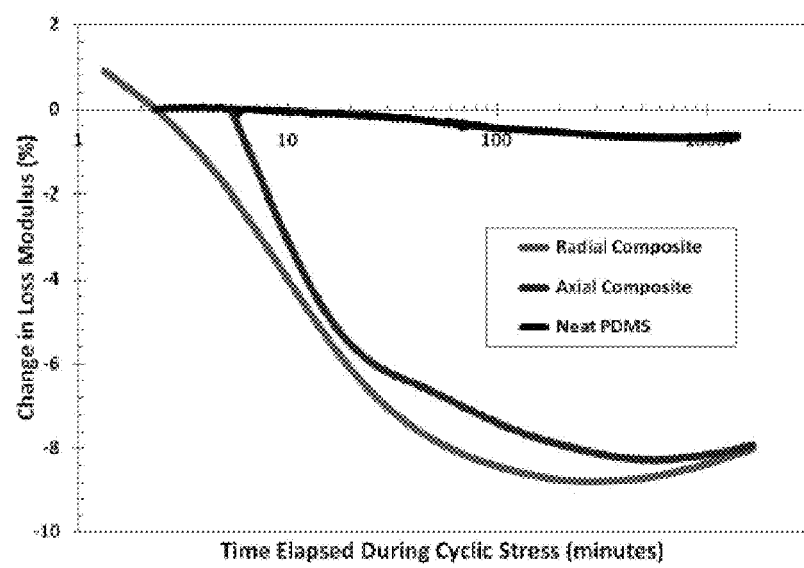
Figure 5:
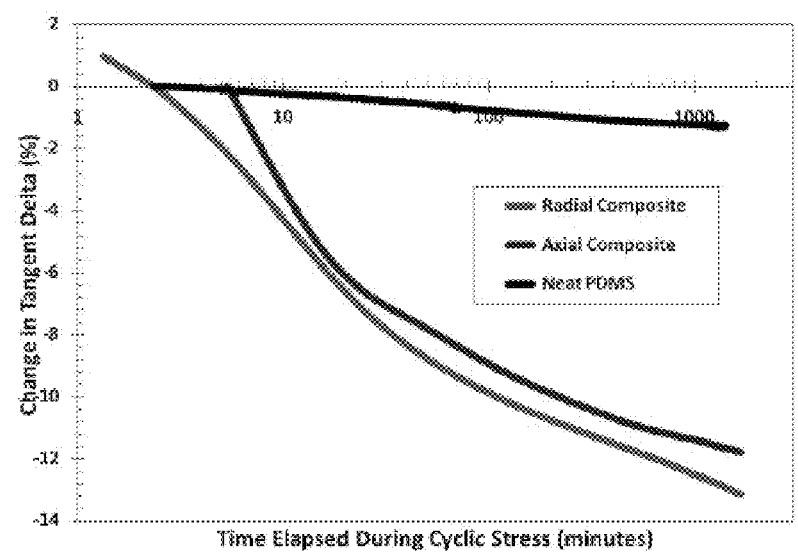
Figure 6:
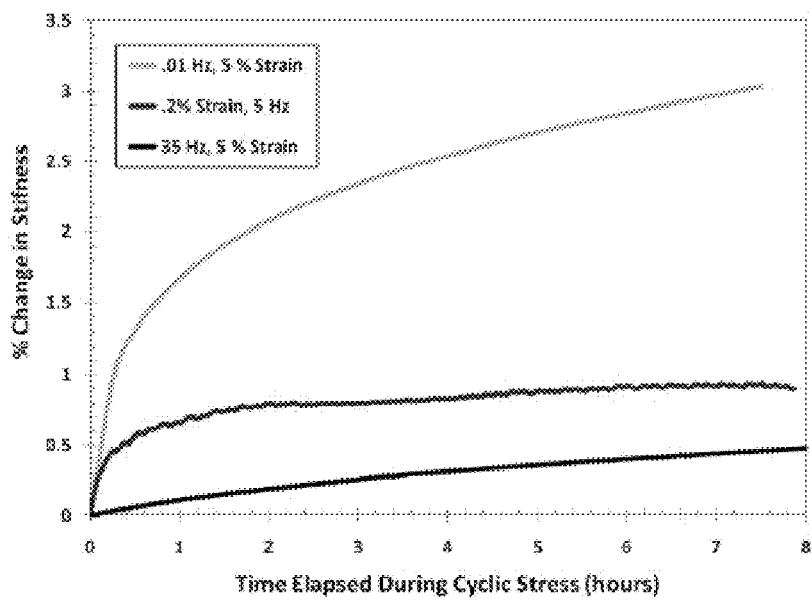
FIG. 6 shows relative independence of driving frequency and strain amplitude for stiffening of PDMS/CNT composites, and observation of stiffening in other composites.
Figure 6:
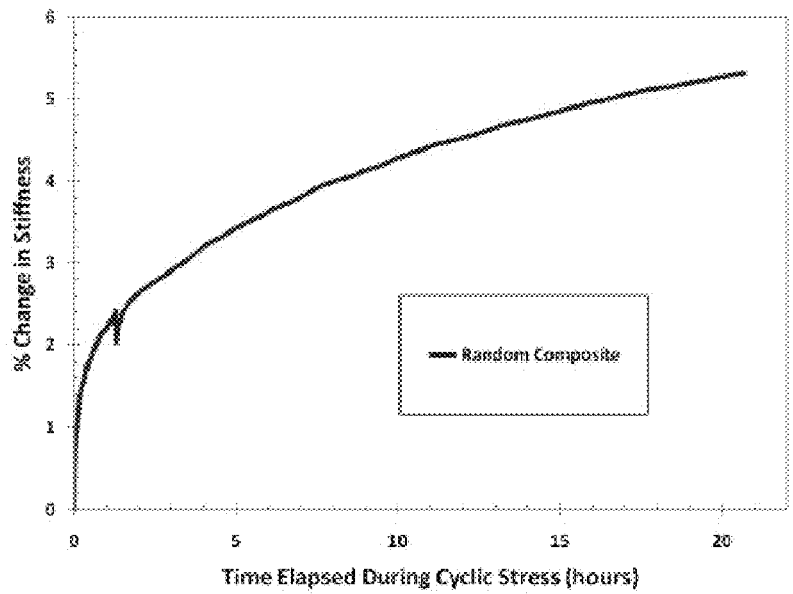

Comparing the other viscoelastic properties in FIG. 5, this stiffening is characterized by an increase in stiffness and storage modulus with a concurrent decrease in loss modulus and damping for the composites. Testing at various frequencies and strain amplitudes also exhibited the effect, and the phenomenon was also observed in randomly oriented CNT composites prepared two years ago, signifying that this mechanism is not isolated to the specific experimental parameters used, the alignment of the CNTs, or fresh composites (FIG. 6).

Figure 7:
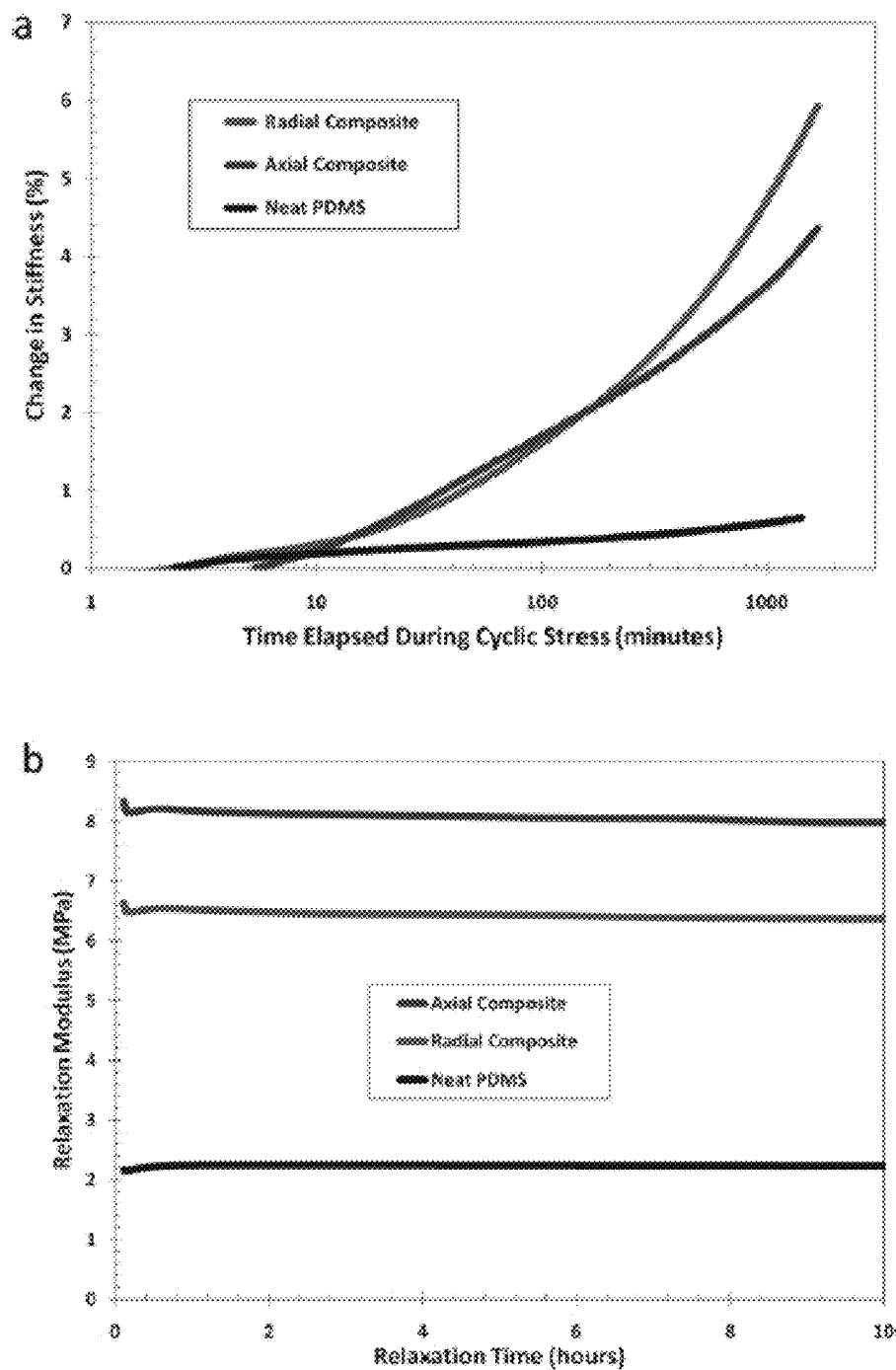
FIG. 7 compares testing orientation of PDMS/CNT composites, and provides proof of permanent stiffening in the composites during dynamic stress.
Figure 7:
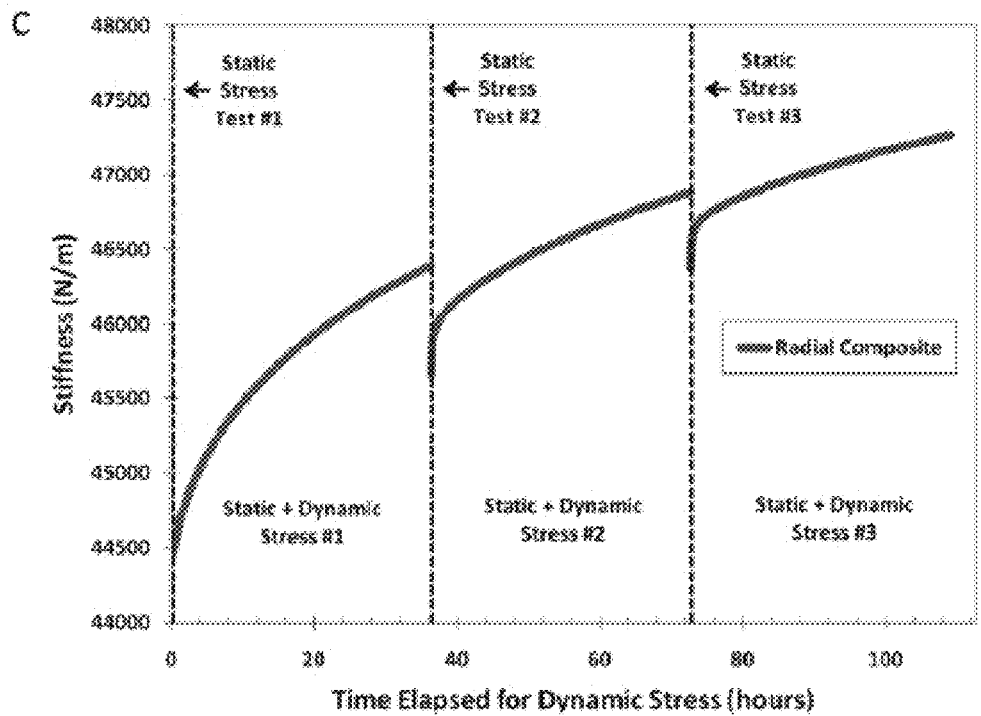

After exploring the limits by which to observe the phenomena for dynamic stress, the material was then tested with static loads to ascertain whether or not the stiffening would occur in the absence of cyclic loading. While stress relaxation testing (FIG. 7B) revealed no increase in the relaxation modulus, the effects of such testing on the stiffness reported by the DMA during dynamic stress are not immediately apparent. To clearly delineate the contribution from both modes of deformation, a single sample was then subjected to alternating static and dynamic loads. In agreement with the stress relaxation testing, Applicants see in FIG. 7C that the static tests did not contribute to the stiffening. Furthermore, since the sample was allowed to recover in the 8 h between each of these tests, Applicants note that there is a temporary relaxation that occurs at the offset of dynamic stressing. Thus, it is evident that the stiffness between each dynamic test begins at a lower value than the ending point of the previous one, but that it quickly resumes the path from the first test. Since each subsequent dynamic test shows a smaller drop, Applicants envision that the temporary mechanism is recoverable, and that there is a transition from temporary to permanent improvement during continuous stressing. This recoverability is also observed in samples that rested for only 10 min between dynamic tests, which implies that the partial relaxation occurs very quickly. Lastly, this test confirmed that the observed change in stiffness was a result of a change in the properties of the material and not a result of samples dynamically creeping during testing.

Figure 8:
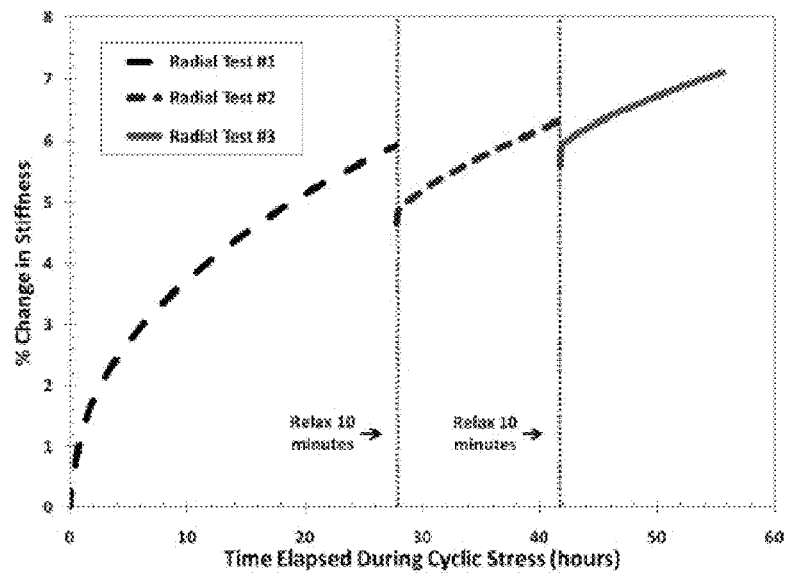
FIG. 8 shows supplemental repeatability testing and proof of consistent dynamic creep in PDMS/CNT composites. As in FIG. 7C, it can be seen that the stiffness of the composites is retained between dynamic tests (FIG. 8A), while there is some relaxation. While the dynamic tests in FIG. 7C did clearly compress further due to the addition of the dynamic force, it can be seen in FIG. 8B that each set of tests creeped identically, eliminating the concern that this stiffening is an artifact of the testing method.
Figure 8:
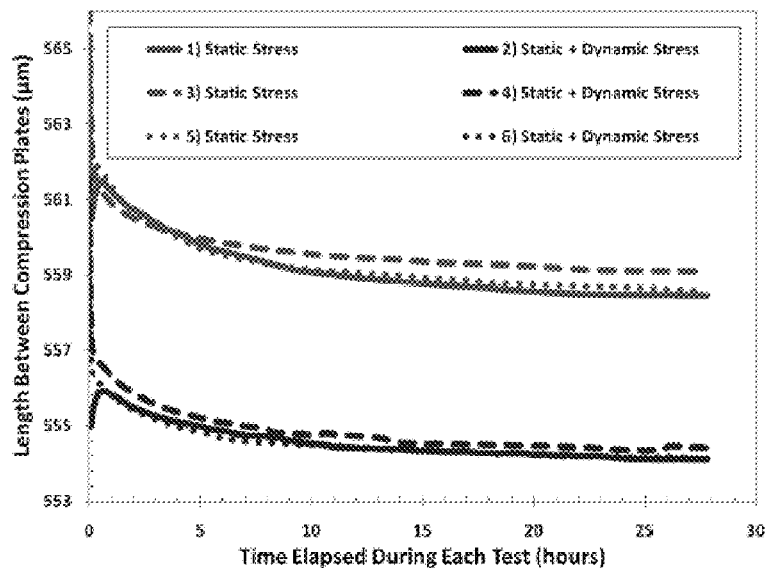

In FIG. 8, Applicants note that the sample displaced in the same manner during each static and dynamic test. Such observations eliminate any concern that a shifting zero point of oscillation was responsible for the perceived stiffness increase.

Example 1C

Mechanistic Aspects of Nanocomposite Stiffening

To begin to resolve the mechanism for this change in stiffness, it is desirable to further understand how changes in the polymer influence the effect. It was recently reported that the cross-linking mechanism near the CNT/polymer interface may be interrupted by the presence of the CNTs for epoxy and silicone elastomer matrices. The intent of the following experiment was to resolve the role that the degree of curing may play in explaining the stiffening phenomenon. Using the as-cured (1 h at 100° C.) composite as a control, an identical specimen was subjected to an additional 3 days of 100° C. heat treatment. By subjecting these samples to identical testing conditions, Applicants are allowed to differentiate between the stiffening behavior and any changes occurring exclusively due to further chemical changes in the polymer (cross-linking).

Figure 9:
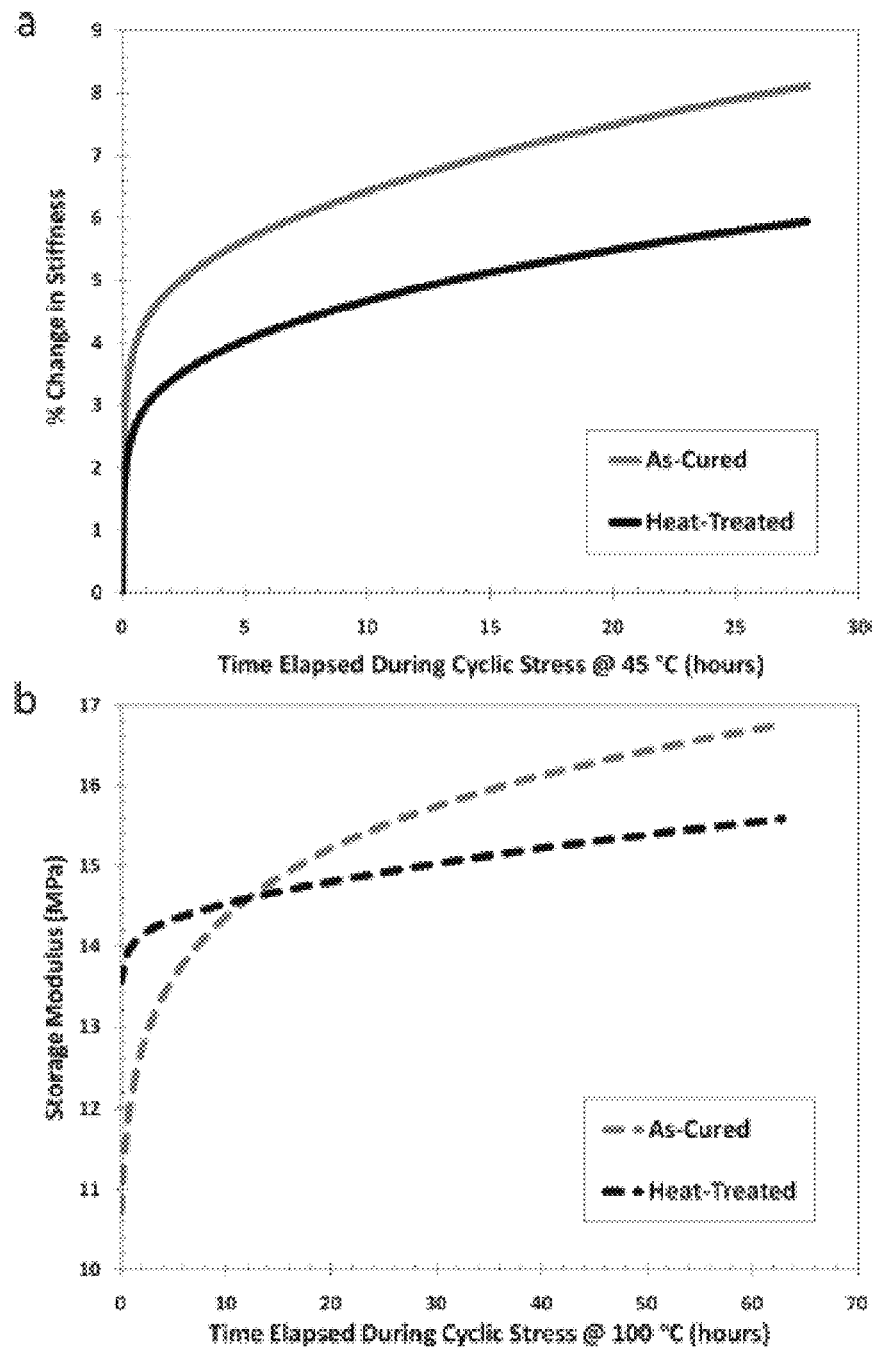
FIG. 9 provides an effect of extended curing on the stiffening of PDMS/CNT composites. The comparison of samples that were tested as-cured to those given 3 days of heat treatment at 100° C. prior to dynamic stressing displays the effects of polymer chemistry (cross-linking) on composite stiffening. When the samples were tested at 45° C., the as-cured sample showed a greater improvement during dynamic stressing, even though there was also an improvement in the heat-treated sample (FIG. 9A). While the heat-treated sample begins at a greater storage when tested at 100° C., it does not have the same potential, potentially due to polymer chain confinements (FIG. 9B). These results indicate that, while chemical changes in the polymer may play some role, another mechanism may be responsible.

A set of these samples were dynamically tested at 45° C. (FIG. 9A). Applicants observed that, while the percent improvement is greater for the as-cured sample, Applicants still observed the stiffening in the sample that can be considered close to fully cured. When dynamically stressed in a 100° C. environment (FIG. 9B), it is apparent that the heat-treated sample began its dynamic test with a greater storage modulus due to the extended curing it underwent prior to testing, but that its ultimate improvement is less than the sample that was dynamically stressed during its first exposure to extended heating. This observation is notable since the heat-treated sample was ultimately subjected to the 100° C. environment for twice as long as the as-cured sample, further strengthening the argument that this effect is not simply a result of further cross-linking of the polymer.

Without being bound by theory, Applicants draw the following conclusions from the aforementioned experiments and observations: (1) the composites are not fully cured after the recommended curing regimen; and (2) while the cross-link density may be correlated to the heightened improvement observed in the as-cured samples, something other than increased cross-linking may be responsible for the stiffening.

In addition to affecting the curing kinetics, it is known that interstitials (and particularly those with nanoscale dimensions) can have profound effects on the morphology of polymers. To probe this, the thermomechanical behavior of polymers can be used to resolve the kinetics of their second-order phase transitions and other thermodynamic events to expose subtle structural nuances that may be difficult to detect through microscopy or spectroscopy. The heights of the two major second-order phase transitions in this polymer, the $\alpha$ (glass) and $\alpha^*$ (crystal-crystal slip) transitions, represent respectively the relative quantities of the amorphous and crystalline regions that exist in the sample.

In FIG. 10A, Applicants see that, at room temperature, PDMS is largely amorphous. Coupled with the limberness of the polymer chains and the chain-end cross-linking in this particular PDMS, such observations account for the ability of PDMS to deform elastically to very large strains. PDMS is also known to cold crystallize in the temperature range of approximately −100 to −70° C. By isothermally holding the samples in this temperature range during testing, Applicants can probe the rate of crystallization and, afterward, any evolution of the transitions as a result.

Comparing the transitions in the neat polymer samples and the composites that have been subjected to various stresses, there are no distinct differences between the position and shape of these two peaks between all of the samples both before (FIG. 10A) and after (FIG. 10B) cold crystallization. Such observations suggest that the CNTs are not coalescing and that they are not altering the steady-state degree of crystallinity in the polymer. However, there is a significant difference in the way each of these samples cold crystallizes, revealing information regarding the morphology of the polymer in these samples. The evolution of the damping in the samples during cold crystallization (FIG. 10C) allows Applicants to resolve the rate at which the crystallites are forming. Applicants observe that both the unstressed and dynamically stressed neat PDMS samples take ~40 min to begin crystallizing, a result that is explained by the fact that it takes time for the PDMS chains to kinetically arrange in order to form the crystallites. In contrast, the unstressed and statically stressed composites begin crystallizing much earlier, indicating that the presence of the CNTs seeds the polymer crystals. CNTs have been shown to considerably affect the polymorphism of the polymer matrix and have been reported to affect the crystallization temperature, broaden the crystallite size distribution, and even promote the formation of other thermodynamically stable crystal phases.

Figure 10:
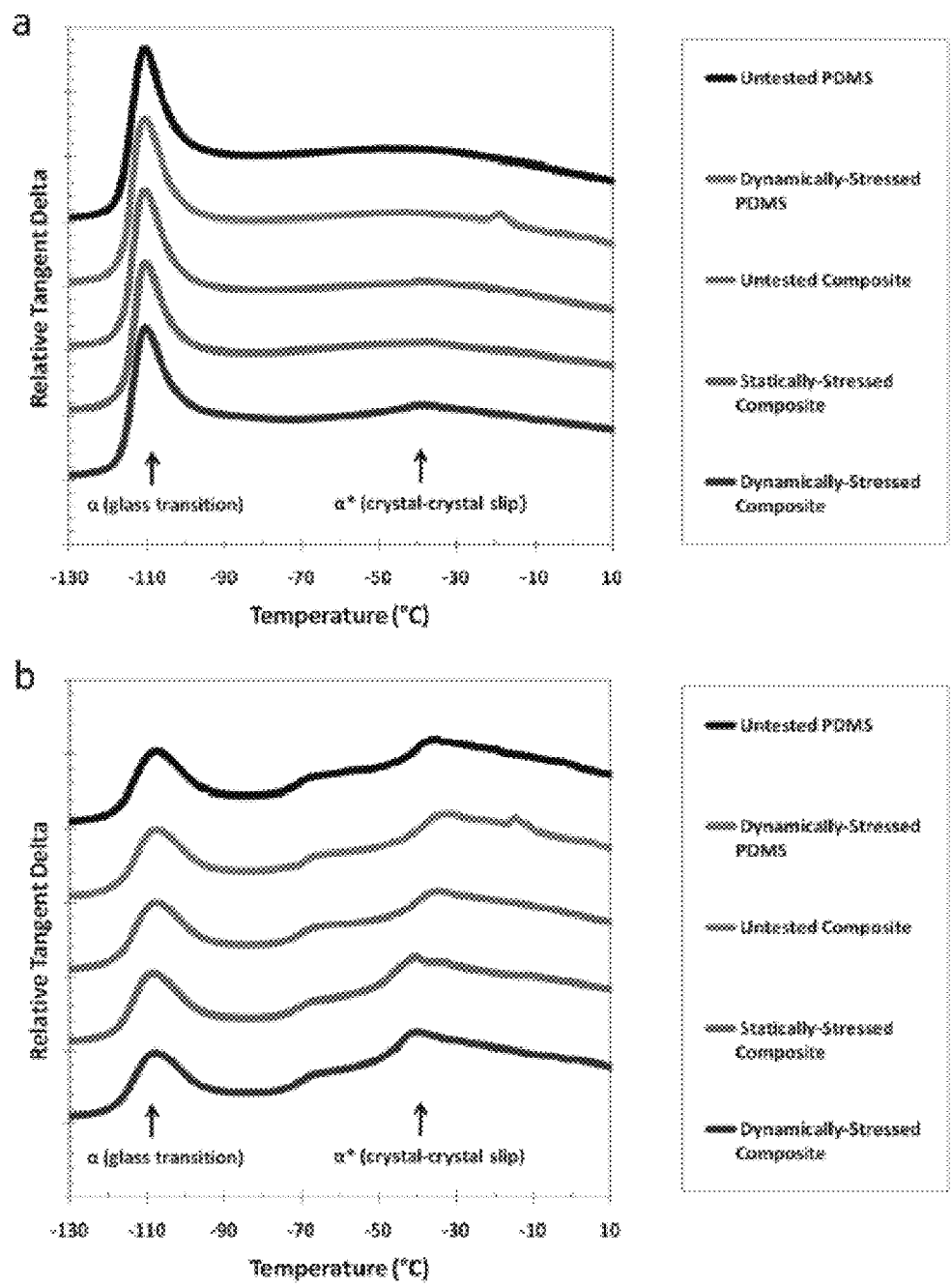
FIG. 10 shows observance of rapid cold crystallization in PDMS/CNT composites after dynamic stress. Thermal transitions in the polymer, such as the $\alpha$ (glass) transition, which indicates amorphous structure, and the $\alpha^*$ transition, which represents crystal—crystal slip, are identical before (FIG. 10A) and after (FIG. 10B) cold crystallization takes place, suggesting that the CNTs are not coalescing, and that the amount of steady-state crystallinity in the sample has not changed. The rate at which crystallization occurs, however, varies greatly between each sample (FIG. 10C). The unstressed and statically stressed composites begin crystallizing much earlier than both the unstressed and dynamically stressed neat polymer samples, while the dynamically stressed composite begins crystallizing immediately upon entering the temperature regime where crystallization can occur. Such results may indicate increased polymer chain alignment/organization that is induced by the dynamic stressing of the composite.
Figure 10:
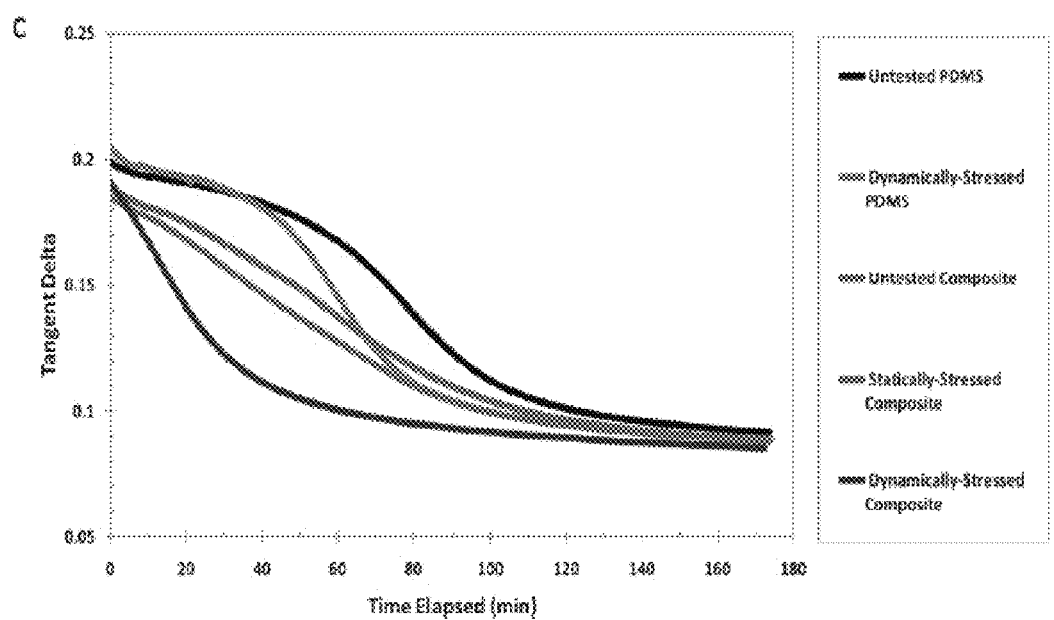
Figure 11:
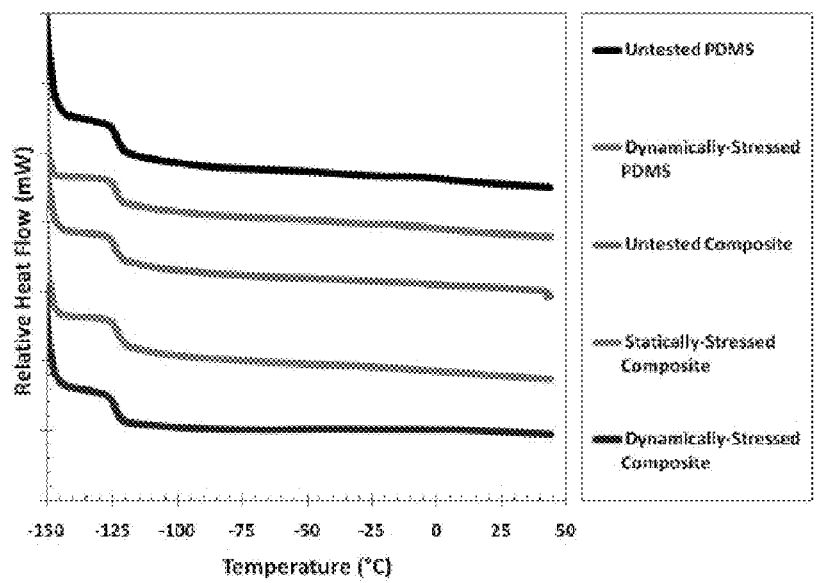
FIG. 11 shows supplementary thermal scans of second-order transitions in PDMS. Differential Scanning Calorimetry (DSC) thermograms of the neat polymer and the PDMS/CNT composites subjected to various stresses prior to (FIG. 11A) and after (FIG. 11B) cold crystallization identically match the transitions observed in DMA testing.
Figure 11:
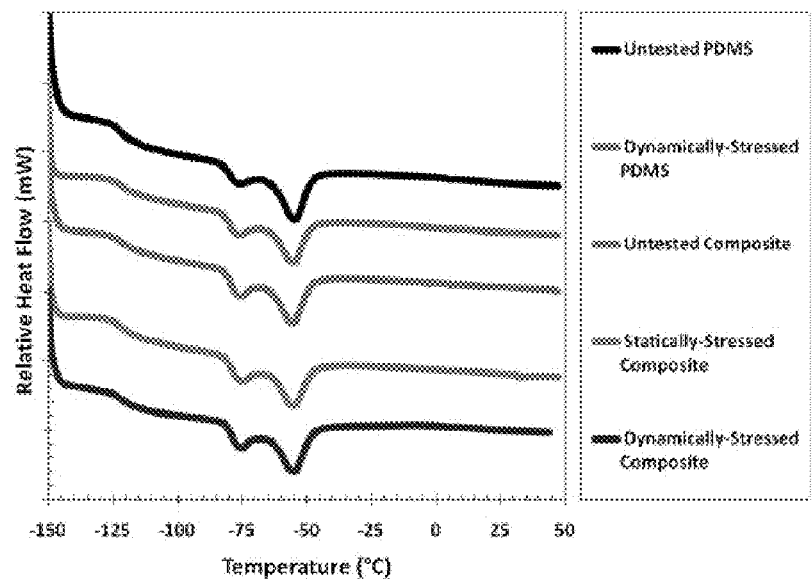
Figure 12:
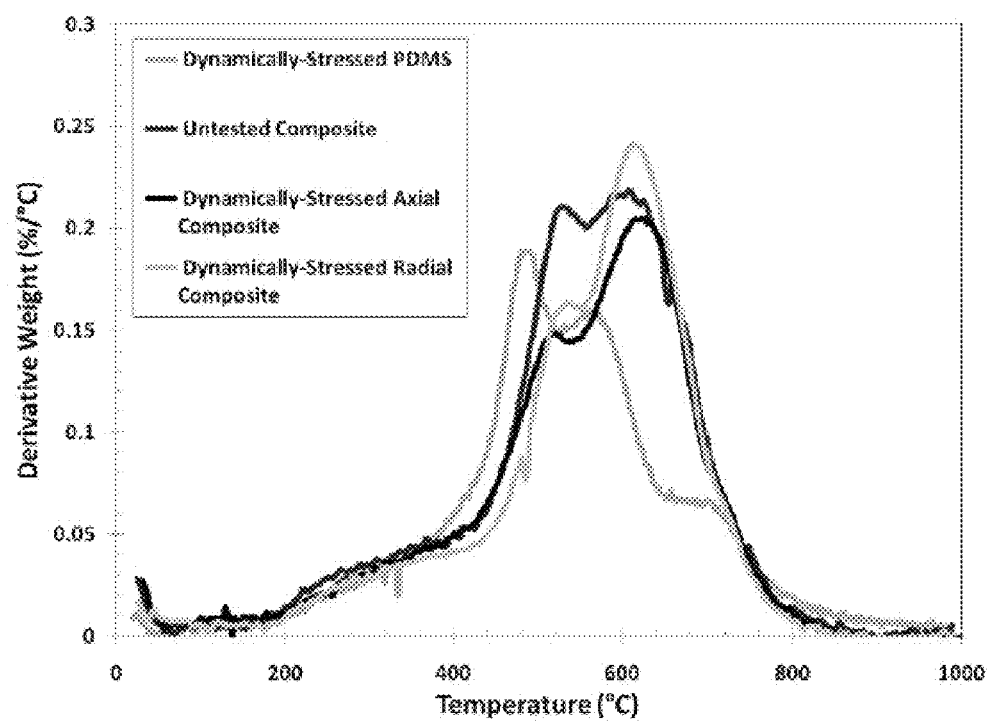
FIG. 12 shows supplementary thermal decomposition analysis of PDMS/CNT composites. Thermogravimetric analysis (TGA) reveals that there is a clear difference between the untested and dynamically-stressed composite samples, suggesting that there may be a change in the polymer.

The specific observation of nanostructure-induced polymer crystallinity has been reported for several semicrystalline polymer matrixes, is supported by a recent molecular dynamics study reporting polymer crystallization in the presence of nanoscale particles, and was observed specifically in PDMS, where ~250 nm agglomerates of 10-20 nm-in-diameter fumed silica particles were observed to locally enhance its cold crystallization. While the CNTs have an effect on the morphology of the amorphous polymer, a notable result from FIG. 10C is that the dynamically stressed sample begins crystallizing immediately upon being introduced to the temperature range where crystallization can occur, indicating that the polymer chains are even more organized in this sample, allowing them to rapidly form crystallites. The pre- and post-crystallization thermal scans are identical for differential scanning calorimetry (DSC), as seen in FIG. 11, and the above observation that there is a change in the polymer after dynamic stressing is reinforced by thermogravimetric analysis (TGA), as seen in FIG. 12.

Recently, Coleman et al. proposed that a thicker crystallized shell around CNTs could improve bulk composite strength for semicrystalline polymers (Polymer, 2006, 47, 8556-8561), a phenomenon that they suggested was a potentially beneficial side effect of the presence of CNTs in polymers. In 2004, modeling by various research groups provided evidence for the formation of distinct polymer adsorption layers around CNTs in polyethylene, and their work went on to suggest that well-oriented layers of the polymer at the interface would contribute to enhanced van der Waals interaction with the CNT and, subsequently, better load transfer from the matrix to the nanotube reinforcement.

From the observations above, Applicants envision that additional chain alignment along the PDMS/CNT interface may be responsible for the observed stiffening. The organization of the polymer chains in the interfacial or interphasic region would lead to greater physical interaction with the CNTs and a higher bulk stiffness, and such orientation would account for the dynamically stressed sample's readiness to crystallize as compared to all of the other samples. Without being bound by theory, this is a feasible mechanism even for a fully cured composite, since this particular PDMS (Sylgard 184) cross-links only at its ends, leaving a long uninterrupted chain that can freely translate. Additionally, the importance of chain mobility in explaining this mechanism can also be supported by the fact that this behavior has not been observed previously in the fatigue testing of glassy CNT nanocomposites. In the glassy state, polymer chains are "frozen" in place and exhibit much less local mobility. This behavior not only gives new insight into the CNT/polymer interfacial region, but could be utilized as a technique, similar in practice to strain hardening, to noninvasively improve the mechanical properties of nanocomposites. Perhaps most significantly, Applicants note that the lack of an apparent upper limit to the effect and the enhanced improvement in the as-cured samples as noted in FIG. 9 highlight the potential for even greater improvement if this mechanism can be harnessed and deliberately applied.

Example 1D

Materials and Methods

Carbon Nanotube Synthesis

Figure 2:
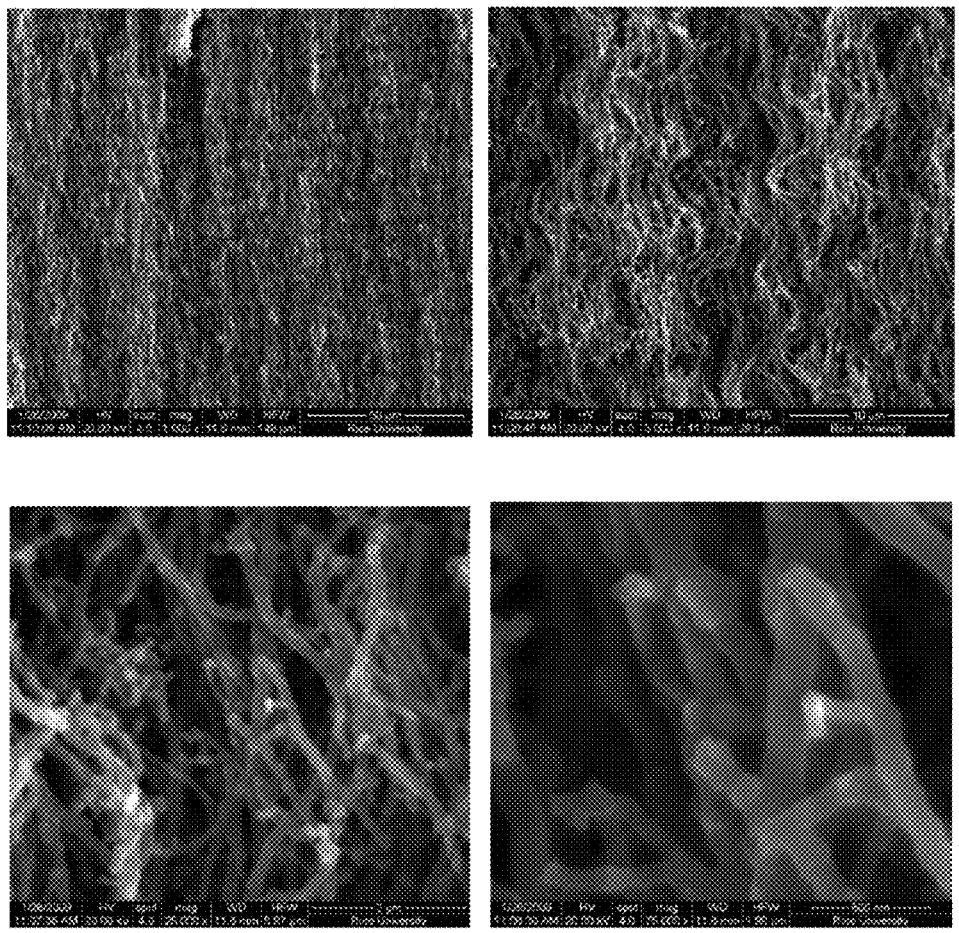
FIG. 2 shows SEM images of carbon nanotube forests used for PDMS/CNT composites. While there is a distinctive "waviness" to the forests, the anisotropicity of the nanotubes can be seen. The non-uniformity of the CNT surfaces is due to the pyrolized carbon coating.

Ferrocene/xylene chemical vapor deposition (Nat. Nanotechnol., 2008, 3, 327-331) was used to grow the vertically aligned CNT forests for these composites (FIG. 2). These forests are loosely packed (~5% volume), have large (~50-100 nm) diameters due to their many-walled structure, and are several millimeters in length, making it easy to prepare and handle macroscopic specimens.

Composite Preparation

The CNT forests were vacuum-infiltrated with the PDMS precursor in a method identical to the one used in the publication introducing this material (Nano Lett., 2008, 8, 2762-2766). Sylgard 184 (Dow Corning), a commercially available, end-linked PDMS, was prepared at the recommended 10:1 weight ratio of monomer:curing agent. After ensuring homogeneous dispersion by manually stirring for at least 5 min, a free-standing forest of vertically aligned carbon nanotubes (approximately 5% volume CNTs) is placed on top of the viscous mixture and allowed to become submerged by scooping excess prepolymer on top of the sinking forest. To expedite the infiltration, the specimen is then held in a vacuum of 1 Torr for at least 3 h, where proof of infiltration is confirmed by the expulsion of bubbles from the forest due to the interstitial air being forced out. When all bubbling has ceased (approximately 3 h), the seamlessly impregnated composite is subjected to 100° C. heat treatment for 1 h, as per the instructions for full curing. The resultant composite can then be separated from the surrounding neat polymer by manually cutting with a razor blade.

Dynamic Mechanical Testing

The specimens were hand-cut with a razor blade, and only samples whose thickness and cross-sectional area were within 10% of the ideal were used. Dynamic compressive testing as illustrated in FIG. 4B was conducted on a TA Instruments Q800 DMA at a 5% strain amplitude and at a frequency of 5 Hz (unless otherwise noted), which allowed for significant cyclic compressive loading without any risk of resonant or inertial effects (as per FIG. 3). All tests were conducted isothermally at 45° C. in order to maintain a stable temperature profile without the use of liquid $N_2$, though the described behavior was observed for ambient temperature testing as well.

Stress Relaxation Testing

Using the Q800 and samples identical to those used for dynamic testing, stress relaxation testing was conducted at 10% strain at 45° C.

Alternating Static and Dynamic Testing

Using the Q800, the sample was first subjected to a 1 MPa constant load for approximately one day, which is fundamentally a creep test. Without removing the sample or otherwise disturbing it (to ensure consistency between tests), the same sample was then subjected to an identical static load with an added 5% strain amplitude. There was no load applied to the sample during the ~8 h in between each test, so the effects of recovery are also observed.

Cold Crystallization Testing

On the Q800, small specimens (0.5 mm long×0.5 mm wide×1.25 mm thick) were tested radially at 2 Hz with a very small amplitude (0.3% strain) in order to remain below the stiffness limit of the instrument when passing through the $T_g$. These measures were necessary due to the fact that compression was the only viable method as a result of the length limitations of the aligned CNTs. Samples were quickly cooled to ~–145° C., then scanned at 5° C./min up to 50° C. for the pre-crystallization thermal scan, then cooled and held at ~–90° C. for three hours to observe the cold crystallization, and finally cooled again to ~–145° C. before ramping at 5° C./min up to 50° C. again for the post-crystallization thermal scan. The data presented in FIG. 10 show the glass transition at ~–109° C. due to the thermal lag during heating. The average $T_g$ for these samples is ~–117° C.

Fundamental Viscoelastic Analysis Testing

Using the Q800 and samples identical to those used for dynamic testing, strain sweeps were conducted at a frequency of 1 Hz for the full force range of the instrument (18 N) and frequency sweeps were conducted at a 1% strain for 0.5-100 Hz. Both sets of tests were run at room temperature with the furnace partially closed to prevent air currents in the room from obfuscating the data.

Differential Scanning calorimetry (DSC) Testing

DSC was carried out with a TA Instruments Q100 MDSC with Tzero pans, a helium atmosphere (50 mL/min), and using a procedure almost identical to the DMA cold crystallization tests. The samples were rapidly cooled to –150° C., scanned from –150° C. to 50° C., rapidly cooled again to –90° C. for three hours to crystallize, rapidly cooled to –150° C., then finally scanned again from –150° C. to 50° C. All scans were conducted at 20° C./min.

Thermogravimetric Analysis (TGA) Testing

TGA was performed using a TA Instruments SDT 2960 at 10° C./min from room temperature to 1000° C. under dry nitrogen flow of 100 cm³/min.

Example 2

Interphase Transformation in Elastomer Nanocomposites During Cyclic Deformation

Polymers are known to behave unusually near surfaces. Such effects result in a transitional region of altered polymer properties around fillers, commonly referred to as the interphase. In Example 1, Applicants reported the observation of a dynamic strain hardening response in PDMS nanocomposites. The feasibility of interphase-moderated strengthening in filled elastomer systems has been hypothesized. Furthermore, direct interrogation of the carbon nanotube fillers and their surrounding polymer region in nanocomposites presents strong evidence that this region transforms during deformation. Wide and small angle x-ray scattering are used to corroborate this. In line with recent experimental work, Applicants deduce that interphasic "bound rubber" on the filler surface disentangles during cyclic stressing, facilitating enhanced interfacial load transfer via the formation of an organized interphasic layer. This self-stiffening mechanism sheds light on the complicated interactions of interphase, and can be employed in developing nanocomposite materials that respond and adapt to applied loads.

The interface between a polymer matrix and reinforcing filler material in composites has been, an area of interest due to the role that it plays in regulating load transfer between the two phases. Just beyond the interface lies an enigmatic region known as the "interphase", delineated by its uncharacteristic morphology and altered dynamics. These vicinities collectively play a vital role in the distribution of applied loads in composite materials, and are of particular interest when using nanoscale fillers. Due to their immense surface area, the reinforcement efficacy of otherwise impressive nanomaterials is frustrated by issues in this region such as steric (conformational) limitations and retarded dynamics. This interfacial/interphasic unpredictability is often blamed for the muted success of nanocomposite materials to date.

It stands to reason, however, that this unusual behavior could be thoughtfully and deliberately exploited to produce unique physical attributes. In 1966, during the naissance of interfacial studies in filled elastomer systems, E. M. Dannenberg proposed that the evolution of physical adsorption on fillers during deformation could contribute to a marked improvement in a composite's strength. Furthermore, Applicants have reported an active self-stiffening response in compliant PDMS/CNT nanocomposites due to dynamic stressing. See Example 1. In this Example, Applicants elucidate through independent techniques that repeated deformation facilitates a structural transformation in the polymer at the interphase. In agreement with both established and recent experimental data, Applicants build off of Dannenberg's hypothesis and propose a viable stiffening mechanism that can be exploited for the development of active, self-strengthening synthetic materials.

It is envisioned that the interphasic region in polymer composites forms due to physical adsorption on the filler surfaces (i.e. van der Waals attraction). It is also envisioned that this behavior results in atypical localized properties, including changes in the glass transition temperature and order-of magnitude increases in modulus. For the case of PDMS and other elastomeric polymers, the interphase partially consists of a discrete "bound rubber" state. Defined by its resilience to good solvents, this nanometer-scale layer is a function of the matrix polymer's molecular weight, and its compatibility with the filler surface. Recently, bound rubber was shown to: (1) exhibit distinct temperature-dependency; (2) appreciably expedite the cross-linking process (vulcanization); and (3) contribute substantively to bulk mechanical properties.

Example 2A

Evaluation of the Interphase of PDMS/CNT Nanocomposites

Figure 13:
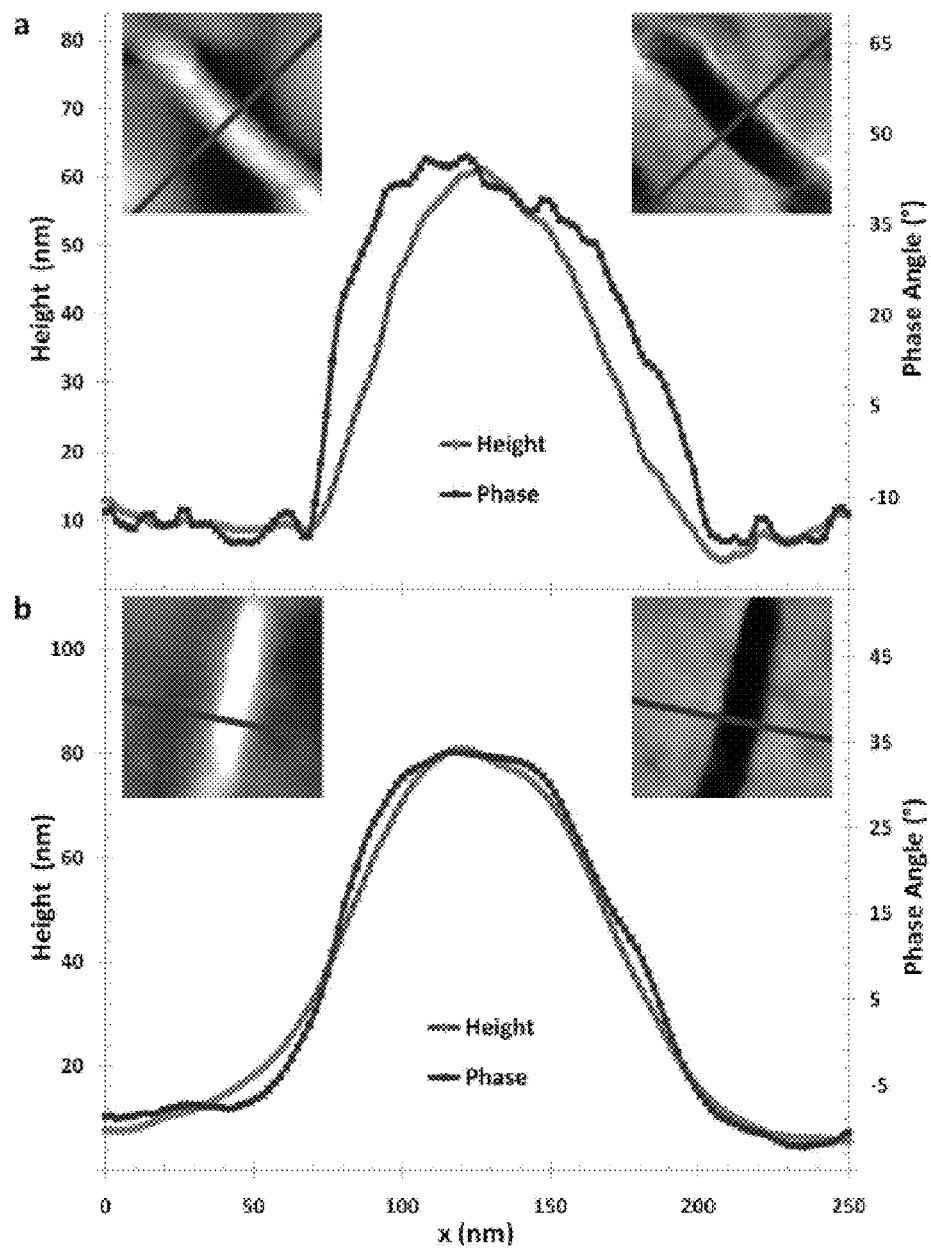
FIG. 13 shows the disappearance of interfacial bound rubber from PDMS/CNT composites. Direct interrogation of the polymer/filler interface in the composites via atomic force microscopy reveals that a "bound rubber" state at the interface of the as-made material (FIG. 13A), which is lost during dynamic stressing (FIG. 13B). Enhanced thermal expansion normal to the nanotube alignment direction after stiffening (Table 1) supports the result that the polymer on the nanotube surface is disentangled during repeated deformation.

Methods of characterizing bound rubber remained relatively cumbersome until recently, when Qu et al. compared the height and phase signals of a tapping mode atomic force microscopy line scan to detect its presence on the surface of carbon black particles and aggregates. *Soft Mater.* 2011 (7): 1066-1077. For this test, a phase signal that is noticeably broader than the height designates a region of retarded dynamics on the embedded filler due to the bound polymer. Applying this technique to PDMS/CNT nanocomposites, Applicants find that bound rubber is initially present on the surface of the CNTs (FIG. 13A), but is no longer distinguishable after cyclic loading related stiffening (FIG. 13B).

A review of the literature suggests that the morphology of bound rubber is not yet well understood. It was previously shown that the loading of filled elastomers can induce the strain softening of a glassy polymer shell on the surface of the interstitial particles. Furthermore, recent experimental and theoretical studies have demonstrated how confinement can induce the unentangling of polymer chains. Correspondingly, Applicants posit that the "disappearance" of the bound rubber in the nanocomposites can be owed to the disentanglement of the interfacial polymer layer around the CNT fillers. Such a mechanism supports the very recent results of Deng and Van Vliet, who demonstrated an analytical approach to estimate the effective elastic properties of composites with particles encapsulated by an interphase of finite thickness and distinct elastic properties. Their results showed that the interphase stiffness is inversely proportional to filler effectiveness in elastomeric nanocomposites.

Figure 14:
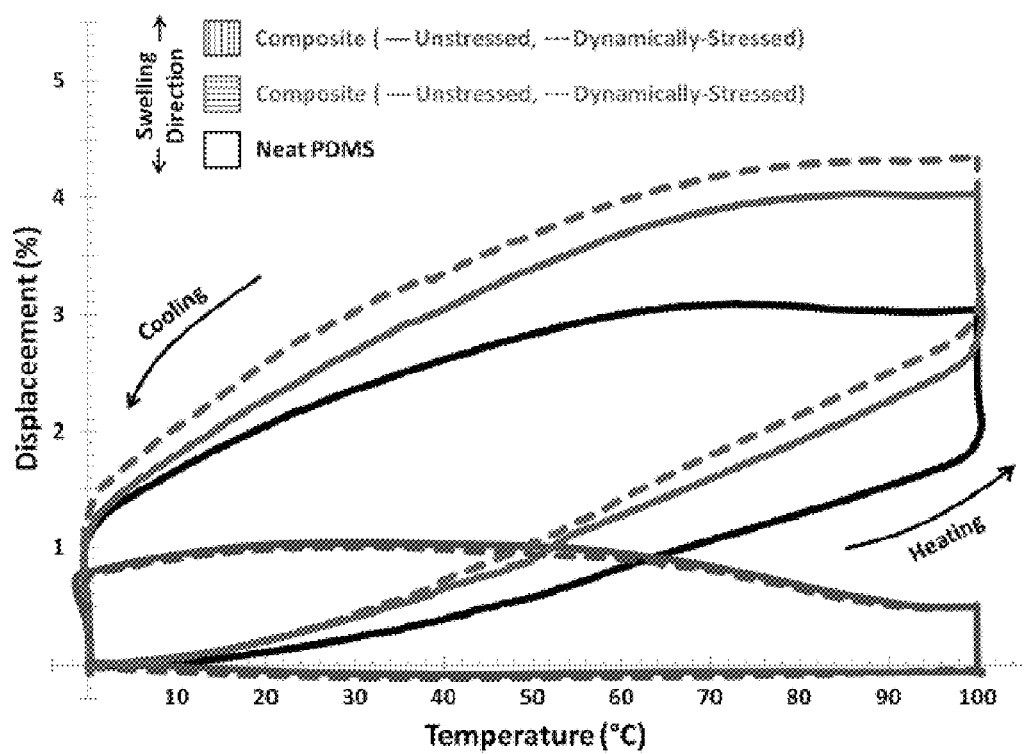
FIG. 14 shows enhanced transverse thermal expansion of PDMS/CNT composites after stiffening. The composite shows an 8% improvement in its transverse thermal expansion after stiffening, suggesting that the interfacial/interphasic polymer is less bound after cyclic stressing.

This structure-property hypothesis also appropriately explains the observed increase in the linear coefficient of thermal expansion transverse to the CNT alignment direction ($\alpha_{transverse}$) after stiffening, as seen in FIG. 14 and summarized in Table 1.

TABLE 1

Longitudinal and Transverse Coefficients of Thermal Expansion.

| | Neat PDMS | Unstressed Nanotube Composite | Stiffened Nanotube Composite |
|---|---|---|---|
| $\alpha_{longitudinal}$ (mm/m/° C.) | .282 | .0233 | .0239 |
| $\alpha_{transverse}$ (mm/m/° C.) | .282 | .385 | .398 |

Figure 15:
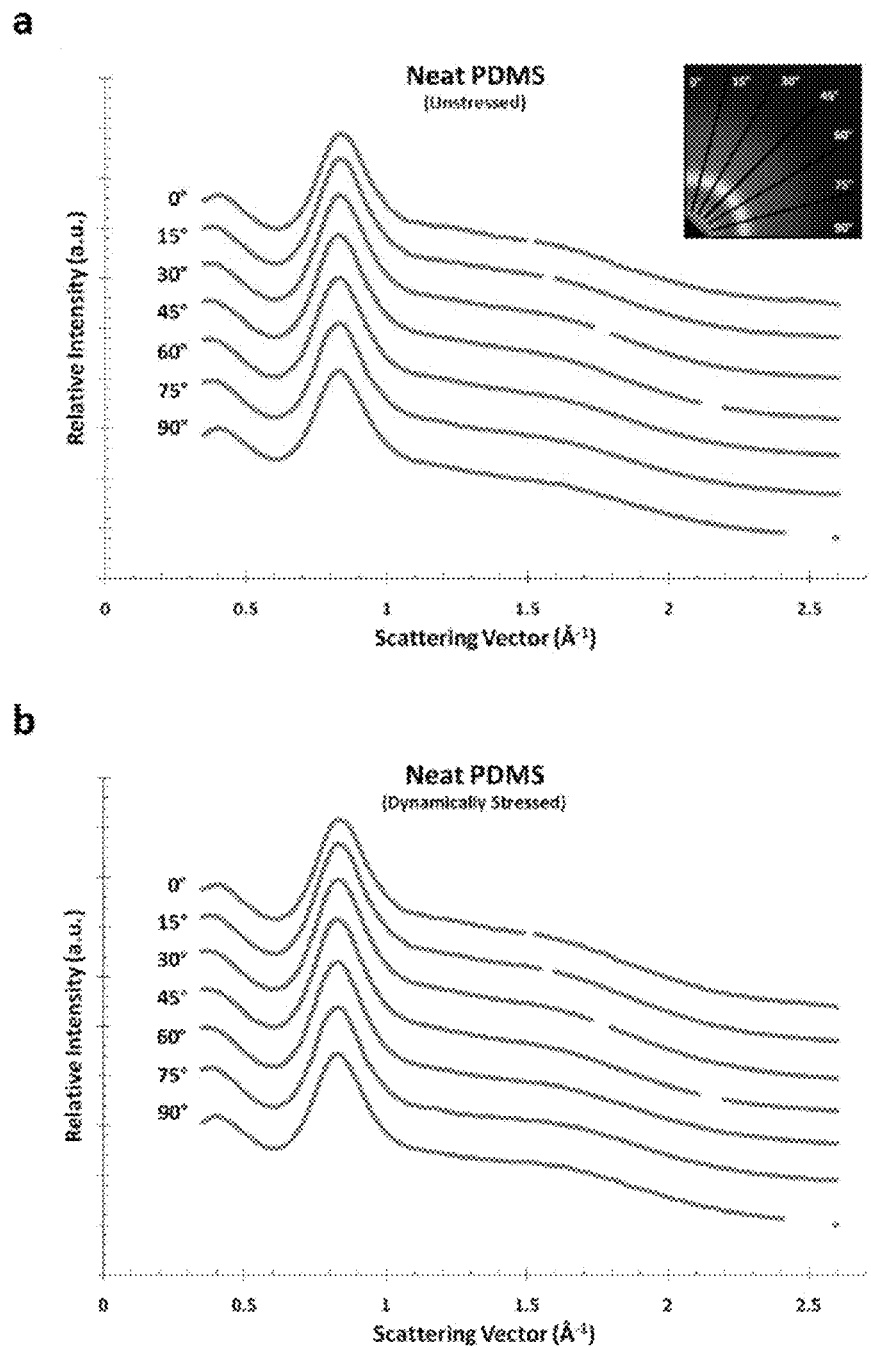
FIG. 15 shows wide angle x-ray scattering (WAXS) radial line integrations of PDMS/CNT composites. Comparing the wide-angle scattering for unstressed and dynamically-stressed samples of the neat polymer, a randomly-oriented multi-walled carbon nanotube (MWNT) composite, and an aligned composite, there was little discernable change in the polymer scattering. A peak at 1.84 $\text{Å}^{-1}$ corresponds to the 0.34 nm spacing between concentric walls in the MWNTs, and confirms the preferential ordering of the aligned CNT composite.
Figure 15:
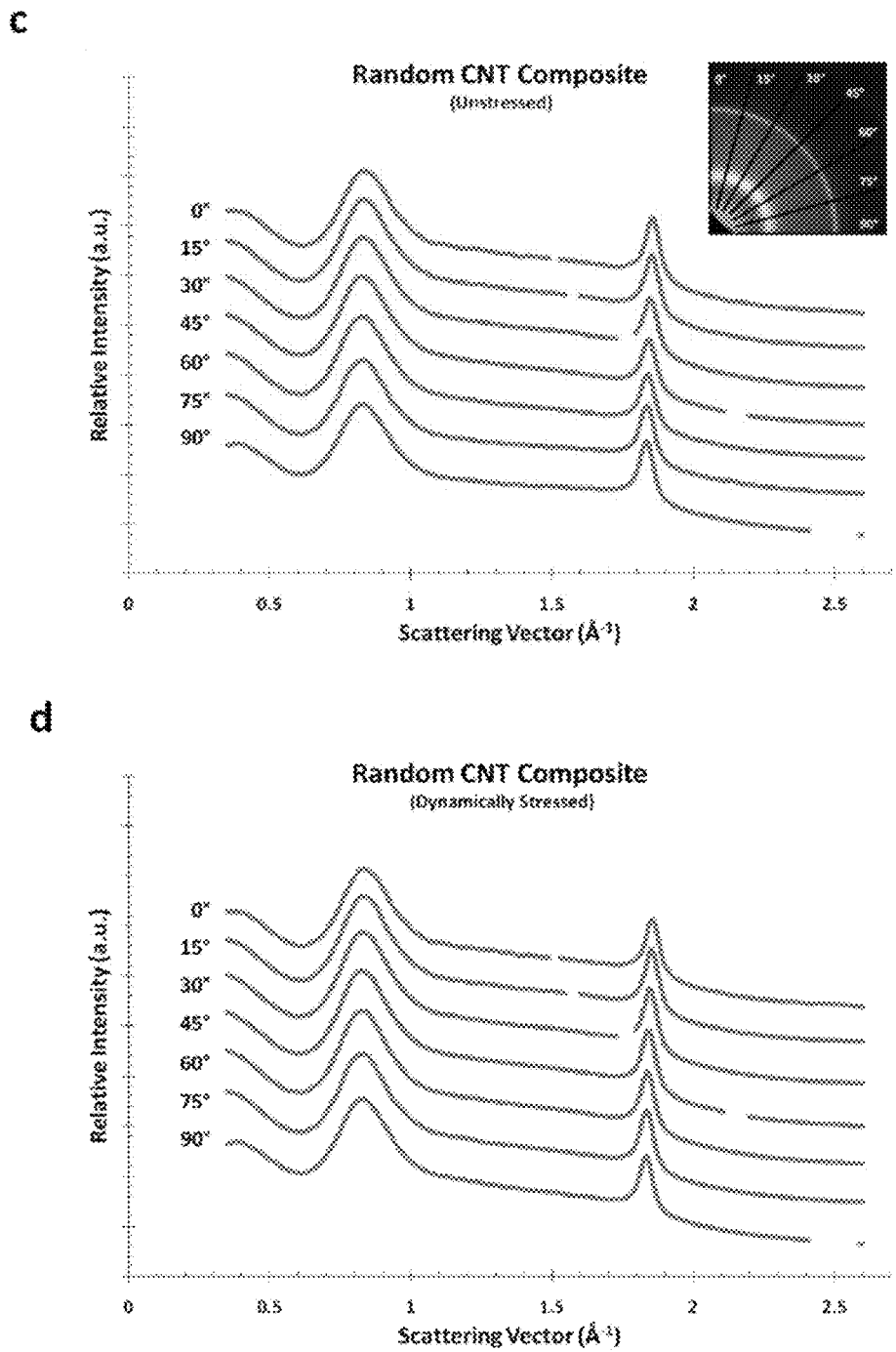
Figure 15:
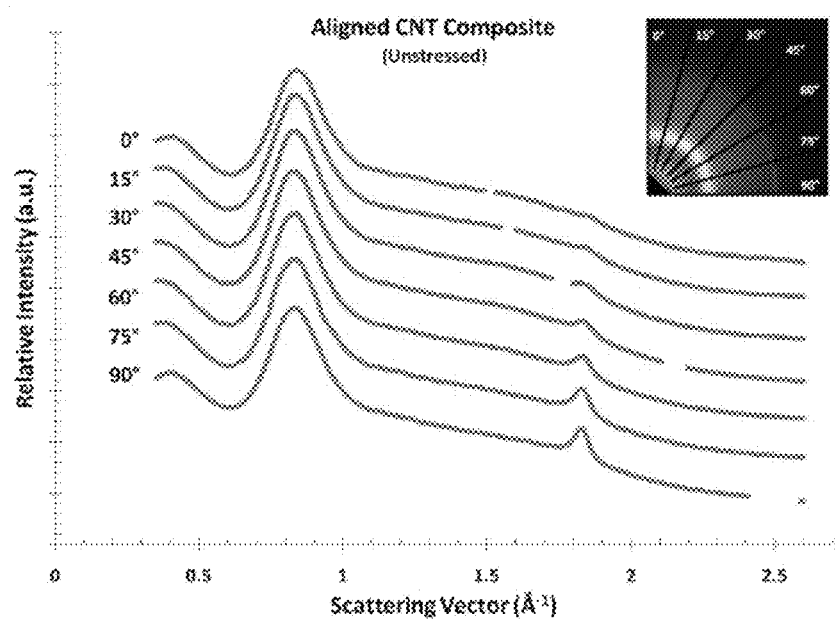
Figure 15:
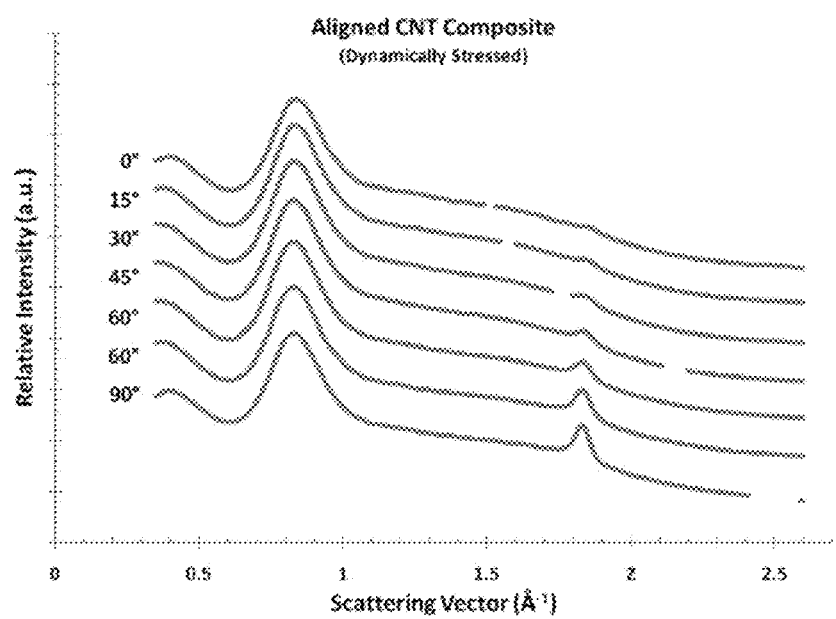

Interfacial confinement is known to dramatically affect both thermal expansion and solvent swelling in filled elastomer systems. Interphasic polymer chains that are no longer "bound" to the surface of the CNTs would be able to participate in the expansion of the matrix during heating. In an attempt to detect such a subtle change in the polymer's morphology, the samples were analyzed using both wide- and small-angle x-ray scattering (WAXS and SAXS, respectively). Able to resolve structures in the sub-nanometer range, WAXS can be used to identify crystallites and other forms of ordering in materials. Comparing the WAXS for unstressed and dynamically-stressed samples of (1) the aligned CNT composite, (2) a similar composite with randomly dispersed CNTs, and (3) the neat polymer for various meridional angles $\chi$, there were no discernable trends in the polymer scattering (FIG. 15). However, one distinguishing characteristic is a distinct peak at 1.84 $A^{-1}$ for the composites, which corresponds to the 0.34 nm spacing between the coaxial walls of the MWNTs. From this signal, Applicants can first qualitatively determine that the randomly-aligned composite is indeed isotropic, and that the aligned CNT forests did maintain their orientation during the polymer impregnation process.

Figure 16:
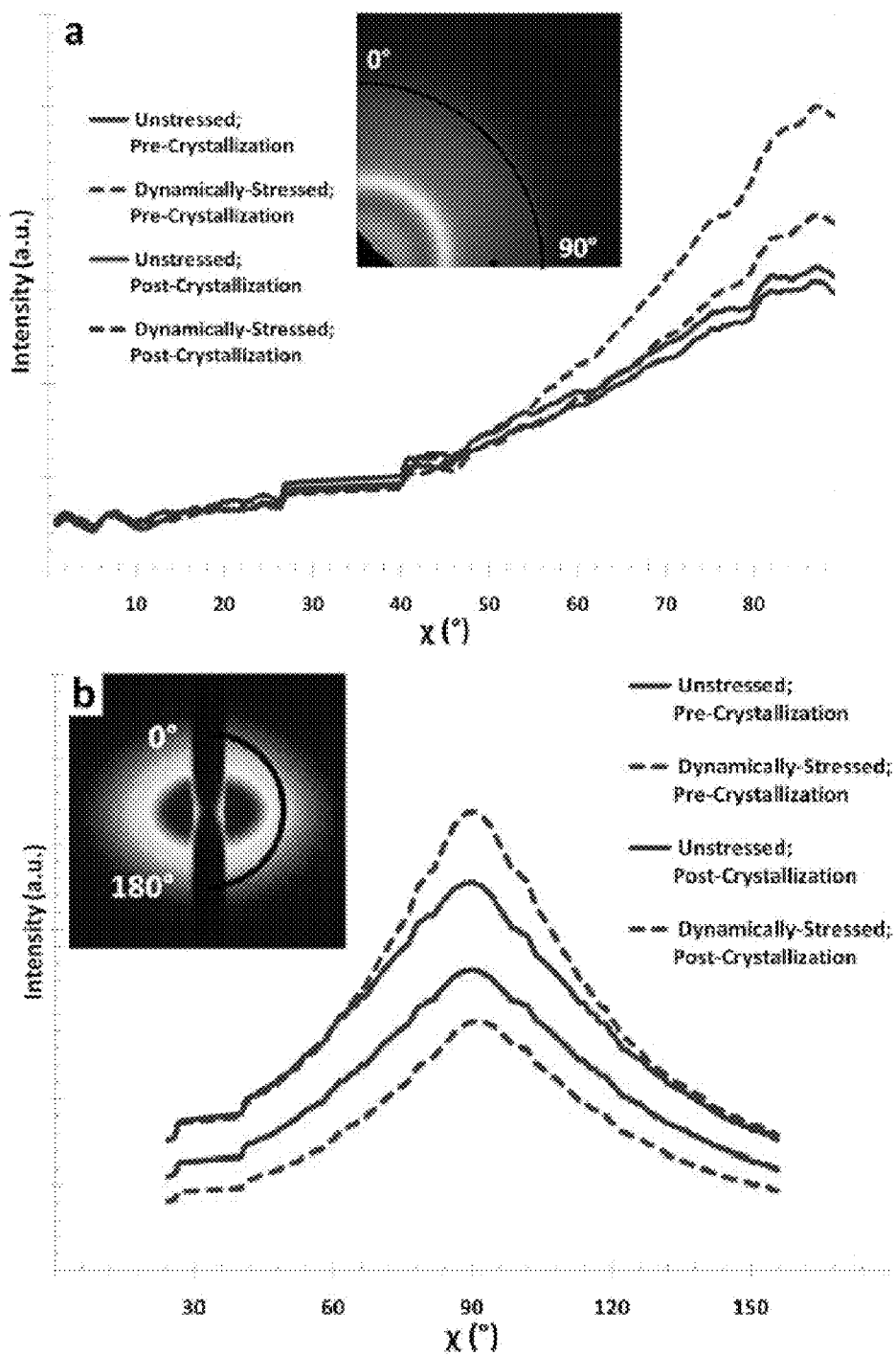
FIG. 16 shows X-ray scattering of PDMS/CNT composites for supporting the morphology evolution hypothesis. Wide angle scattering corresponding to the 3.4 Å coaxial wall spacing of the MWNTs indicates that their collective orientation becomes more anisotropic after stiffening (FIG. 16A). More interestingly, such scattering subsequent to cold crystallization is unchanged for the unstressed composite, while the stiffened composite shows an increase transverse to the nanotube alignment direction. Small angle scattering decreases overall after stiffening, suggesting that the nanotube fillers are less aggregated (FIG. 16B). The total scattering is enhanced in both samples after crystallization, though the stiffened material is similarly enhanced orthogonal to the nanotube orientation. These results provide further evidence of a morphological change in the polymer.

By integrating the intensity of the 1.84 $A^{-1}$ scattering peak in the aligned composite across all $\chi$ (FIG. 16), Applicants observe an increase in intensity orthogonal to the alignment direction of the CNTs after dynamical stress. This suggests that repeated stressing enhances filler anisotropy. The cold crystallization of these samples altered the scattering in a way that sheds further light on their morphological dissimilarities. Post-crystallization, the unstressed composite shows no significant change, while an increase in total scattering is seen in the stiffened material orthogonal to the CNT orientation direction. This increase in signal implies a structural change in the material to enhance the measured scattering that corresponds to the MWNT layer spacing.

SAXS is primarily sensitive to density fluctuations in the −10 nm to −300 nm range, and is effective for determining filler aggregation/bundling. It is clear in FIG. 16B that the diffuse low-q scattering intensity decreased overall for the stiffened material, consistent with a more homogeneous dispersion of the fillers. Cold crystallization again produces a notable result, and it is observed that the unstressed and stiffened composites both exhibit an increase in scattering, while the scattering from the stiffened material is further enhanced orthogonal to CNT alignment.

Figure 17:
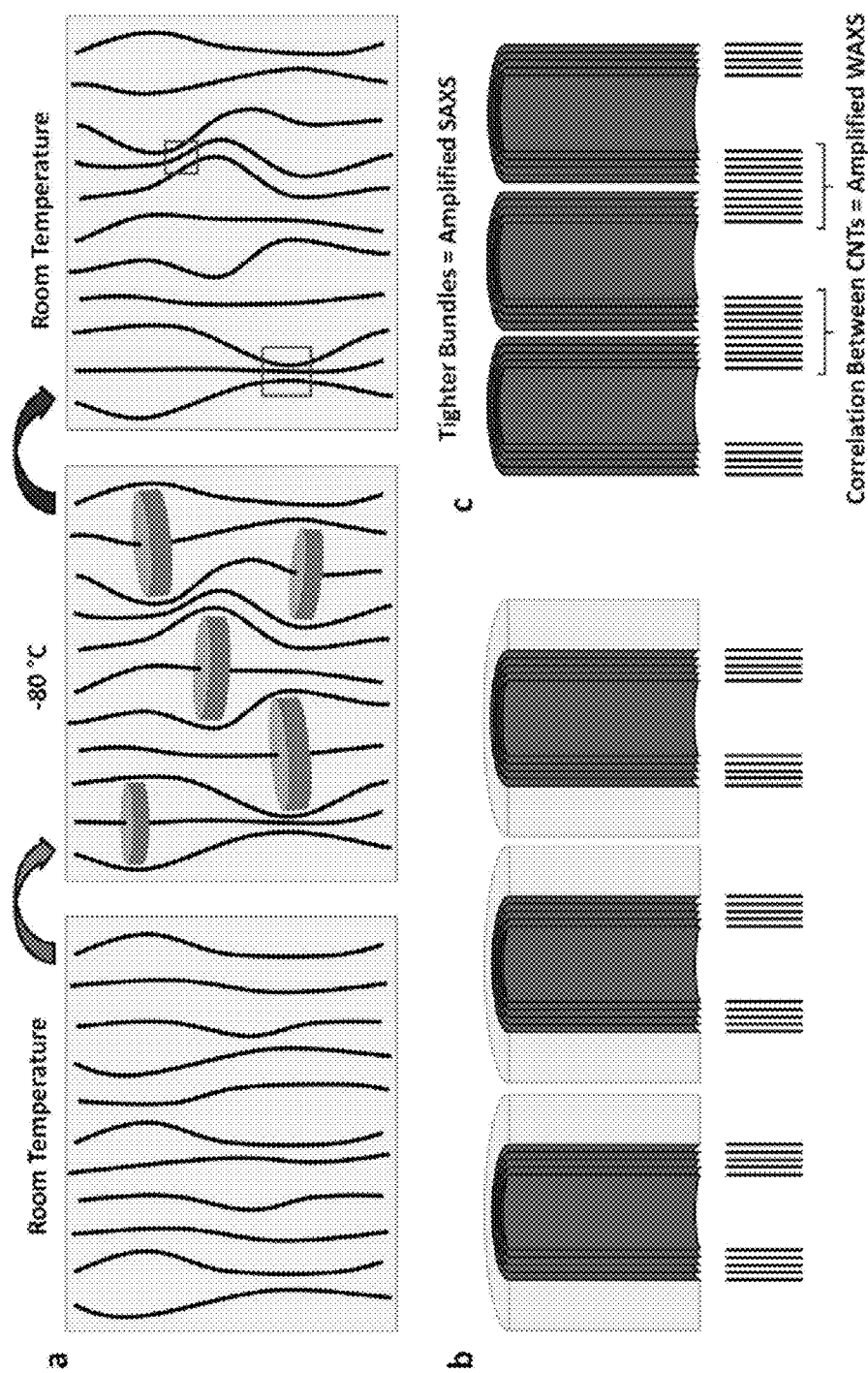
FIG. 17 illustrates the post-crystallization scattering of PDMS/CNT composites. The loss of an interfacial bound rubber provides a plausible explanation of the x-ray scattering results in FIG. 16.

The above-mentioned post-crystallization scattering trends were not expected. However, an explanation may exist for the loss of an entangled bound rubber layer. Khan et al. recently reported that nanoscale fillers can be actively displaced due to the nucleation and development of crystallites in a polymer matrix. *Small*, 2011(7):1579-1586. Furthermore, slender rods such as CNTs have theoretically and experimentally been shown to form "kebab-like" crystallites. In agreement with the total increase in SAXS after crystallization, it is expected that the forming crystals will redistribute the nanotubes, decreasing the homogeneity of the system and producing regions of CNT bundling. See FIG. 17. For the unstressed composite, bound rubber will increase the hydrodynamic radius of the displaced CNTs, effectively preventing close contact. Alternatively, the unencumbered nanotubes in the stiffened composite would be able to form tighter bundles (enhancing orthogonal SAXS), and also allow the concentric walls of adjacent CNTs to correlate (enhancing orthogonal WAXS). The comparison of 3-CNT and 6-CNT constitutive models in FIGS. 18-19 confirm that the WAXS signal from CNT wall-wall spacing can increase for MWNTs in close proximity (on the order of several nm), and that larger bundles can amplify the effect.

Relating to mechanical properties, the scattering data prior to crystallization strongly supports the conclusion that dynamic stress induces the debundling and reorientation of the nanotube fillers. While these mechanisms can conceivably be linked to a change in the mechanical response, it is unlikely that they would contribute to stiffening beyond 3.5 million cycles. An examination of the early literature uncovered a 1966 report, where Dannenberg conjectured that interphasic evolution could lead to strengthening in filled elastomer systems. *Trans. Inst. Rub. Ind.* 1966(42):26-42. At the heart of the work is the concept of interfacial slip, a phenomenon that is now accepted as the molecular basis of the well-known Payne effect in filled elastomers. However, it seems, that the concept of interphase-moderated mechanical improvement has not been validated.

Dannenberg proposed that the strain-induced slip of short polymer tethers between effective particles would lead to a homogenization of interparticle chain lengths, resulting in strengthening due to improved stress distribution for subsequent loading events. This mechanism was expected to induce "molecular orientation" and "increased intennolecular attractions", assertions that are supported by present-day theoretical work. Svistkov developed a continuum-molecular model to demonstrate the nucleation and growth of an oriented interphasic polymer layer during deformation. Previously, a molecular dynamics simulation by Wei et al. predicted the inelastic formation of discrete interfacial adsorption layers that enhance load transfer to CNT fillers via improved van der Waals interaction. *Nano Lett* 2004 (4): 1949-1952.

Figure 20:
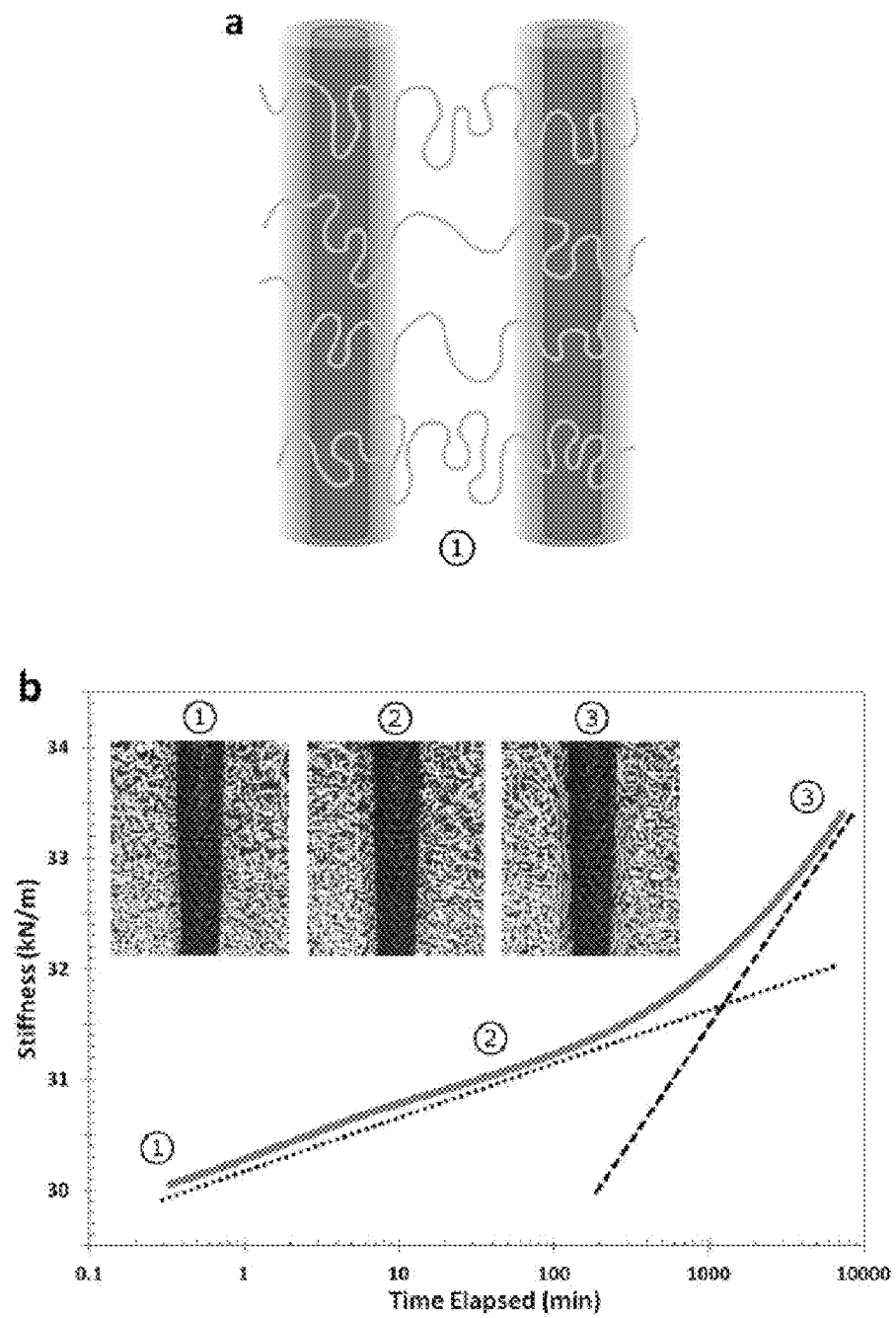
FIG. 20 provides models relating to a strengthening hypothesis by E. M. Dannenberg that slip at the interface could enable a homogenization of polymer chain lengths between filler particles, leading to a better distribution of stress in elastomeric composites (FIG. 20A). A loosening of entangled polymer at the interface would effectively enable such a mechanism (FIG. 20B). It is envisioned that this disentanglement can lead to the formation of an interphase that continually orients itself along the surface of the nanotubes, ever improving load transfer to the fillers (FIG. 20C). This two-part mechanism can explain the two distinct regimes of stiffness improvement during dynamic strain hardening.
Figure 20:
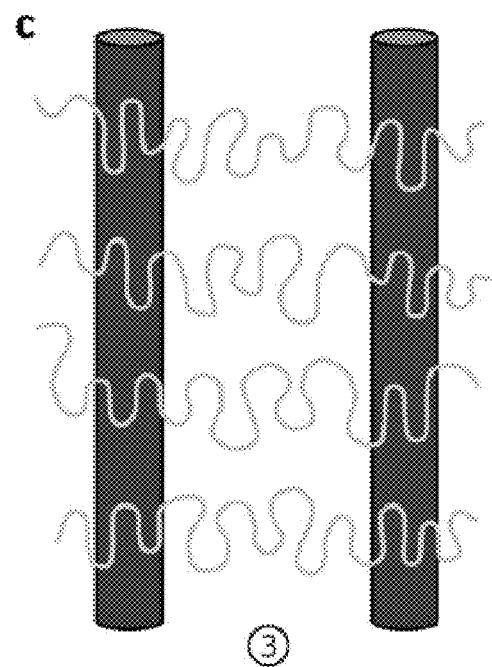
Figure 21:
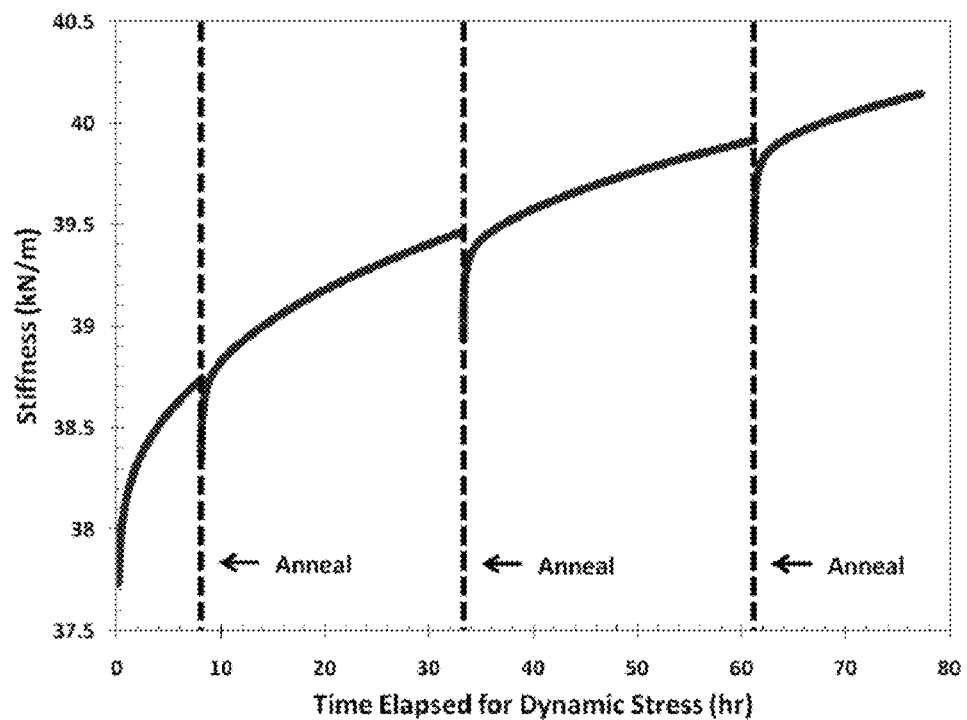
FIG. 21 provides data relating to resilience of stiffened PDMS/CNT composites to annealing. The results indicate that heat treatment (100° C. for 30 min) does not affect the stiffness improvement mechanism.

As illustrated in FIG. 20, Applicants propose that cyclic deformation of the nanocomposite first results in the disentanglement of the "bound" interphase in this PDMS/CNT system, enabling interparticle chain homogenization. The interphase is expected to continue evolving during cyclic loading, continually orienting along the surface of the CNTs to further enhance physical interaction. An untangled, organized interphase explains the stiffened material's enhanced transverse swelling and expedited crystallization behavior. Furthermore, this two-stage mechanism accounts for the two distinct regimes of stiffness improvement that are observed during stressing (FIG. 20C), while explicating the effect's cumulative nature and resilience to annealing (FIG. 21).

In summary, through direct interrogation and analysis of scattering phenomena, Applicants have provided strong evidence that bound rubber is not permanently attached to surfaces, and that interphasic evolution can serve as a mechanism for dynamic strain hardening in compliant nanocomposite materials. The resolution of these interfacial dynamics helps to further discriminate the complicated mechanics of load transfer in nanocomposite systems, and the optimization of this stiffening effect should lead to the development of smart materials that can actively respond to applied mechanical loads.

Example 2B

Materials and Methods

Sample Preparation

The nanocomposite was prepared via the vacuum-assisted impregnation of vertically-aligned arrays of multi-walled CNTs (MWNTs), as detailed elsewhere. *J. Colloid Interface Sci.* 1997(195):329-337. The millimeter-tall MWNT forests were synthesized using vapor-phase chemical vapor deposition with xylene and ferrocene growth precursors. The matrix polymer (PDMS), a silicone elastomer, is commercially available (Sylgard 184, Dow Corning). The MWNTs maintain their alignment during infiltration and provide continuous reinforcement, completely spanning the height of the sample. Samples were cut into rectangular blocks of approximately 2.5 mm long×1 mm wide×1 mm thick. One set of specimens was subjected to repeated stressing using a TA Instruments Q800 dynamic mechanical analyzer at 5 Hz, a 5% strain amplitude, and 45° C. for 3.5 days (1.5 million cycles) in order to induce the stiffness improvement.

Atomic Force Microscopy

The interphasic morphology of these composites was probed via atomic force microscopy (3D Molecular Force Probe, Asylum Research). Silicon cantilevers (OMCL AC240TS-W2, Olympus) with a nominal spring constant k=2 Nm$^{-1}$ were used, and the nominal probe radius and conical semi-apex angle were 10 nm and 35 nm, respectively. Phase-lag images on the same area (1 mm×1 mm) were acquired in AC (tapping) mode using a scan rate of 1 Hz at room temperature (25° C.).

Thermal Expansion

In the Q800, a 5 mN load was applied while samples were cycled between 0° C. and 100° C. at 5° C./min. Each ramp was terminated with a 30 minute isotherm to account for thermal lag and viscous flow in the polymer network. The composite data was collected from one sample that was tested in both orientations (longitudinal and transverse to the CNT orientation), stiffened for 24 hours in situ in the transverse orientation, and then tested again. The plots represent a 5 cycle average.

X-Ray Scattering

X-ray scattering experiments were conducted at the X9 endstation at the National Synchrotron Light Source, using an undulator source and monochromatic x-rays of energy 12.0 keV (λ=0.103 nm). The beam was focused to a spot ~100 µm tall and ~200 µm wide at the sample position using KB mirrors and a series of slits. Samples were measured under vacuum conditions (~40 Pa) to reduce background scattering. Wide-angle scattering (WAXS) was collecting using a 2D charged-coupled device (CCD) detector positioned 217 mm from the sample position. Small-angle scattering (SAXS) was collected using a 2D CCD detector 5.28 m from the sample. Conversion to q-space was accomplished by calibrating with Silver Behenate powder. Measured scattering intensity was normalized using an on-beam monitor to account for variations in beam flux, and by the sample dimensions to account for the scattering volume. Scattering intensity as a function of the meridional angle χ (where χ=0° corresponds to the vertical and χ=90° is horizontal) was obtained by integrating the scattering intensity for the entire peak-width, and subtracting the background intensity just outside the peak region.

Calculation of the Linear Coefficient of Thermal Expansion

The linear coefficient of thermal expansion was calculated using the following equation:

$$\alpha = \frac{1}{L}\frac{\Delta L}{\Delta T}$$

$L_i$=sample thickness at 0° C.
$L_f$=sample thickness at 100° C.

Lengths were read from a 5-cycle average, as with FIG. 14. Measurements were taken after a 30 min isothermal to account for thermal lag in the heating/cooling and viscous flow in the polymer network.

Figure 18:
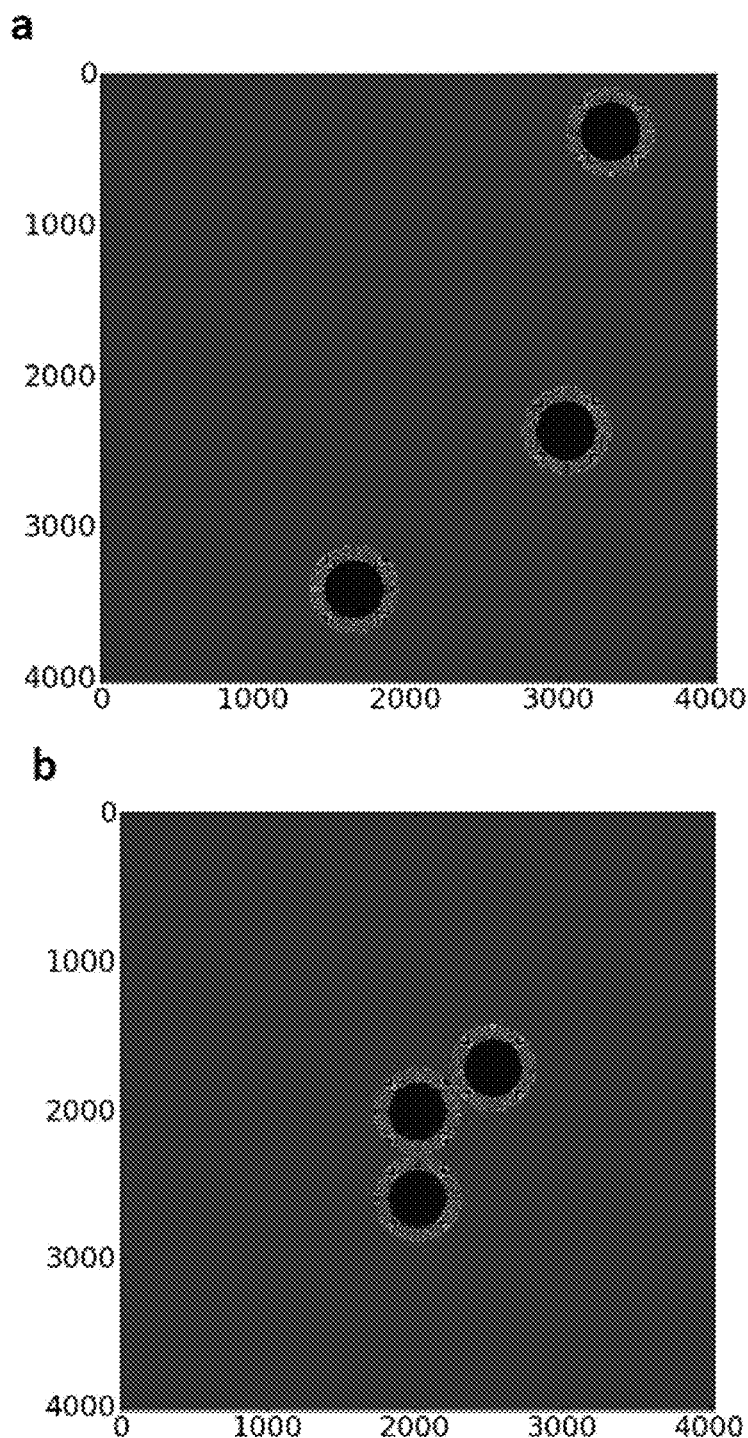
FIG. 18 provides a 3-CNT model to support WAXS amplification in PDMS/CNT composites. A model of WAXS intensity at 1.84 Å$^{-1}$ (3.4 Å) (FIGS. 18A-B) shows that CNTs within close contact can enhance scattering (FIG. 18C). The amplification is apparent for small CNT-CNT spacings (FIG. 18D).
Figure 18:
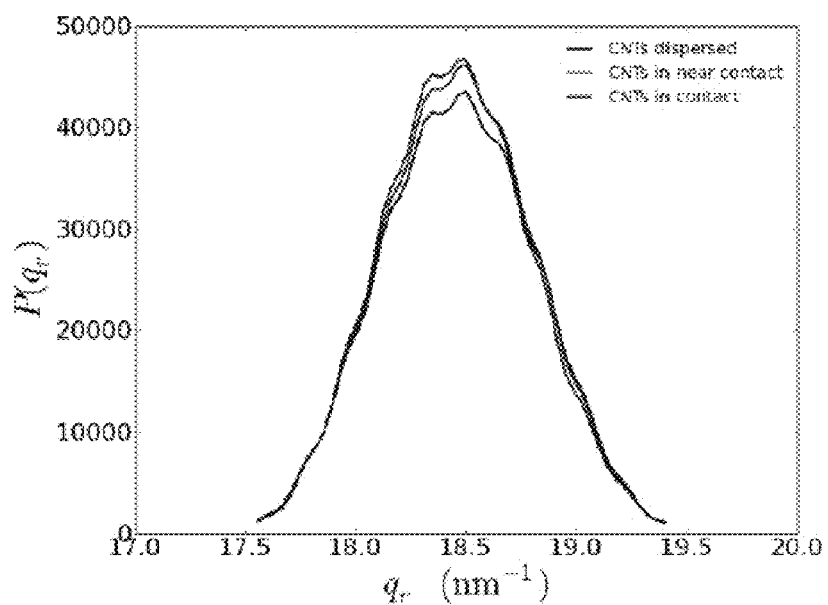
Figure 18:
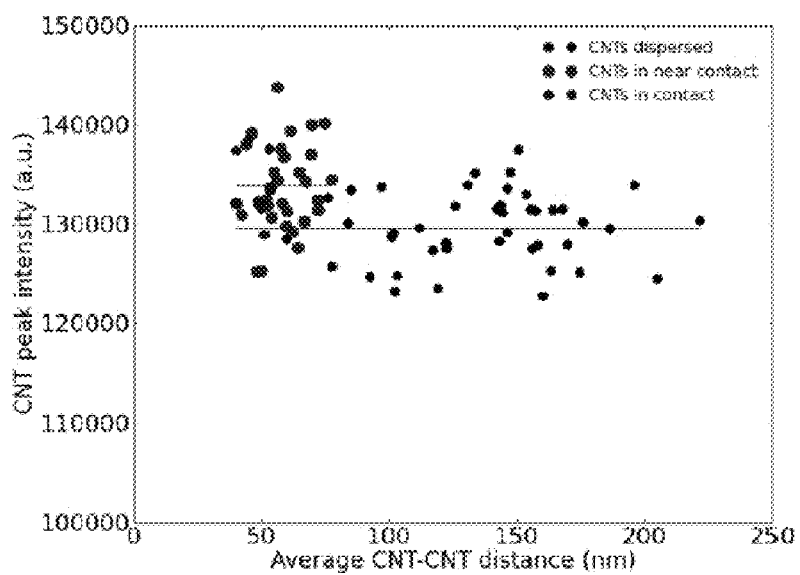
Figure 19:
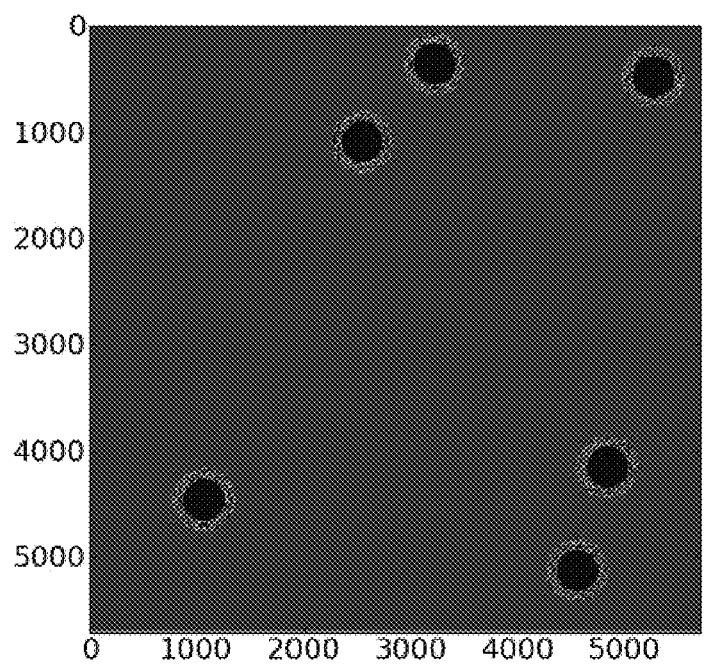
FIG. 19 shows a 6-CNT model to support WAXS amplification. In comparison to the 3-CNT model in FIG. 18, the 6-CNT model can amplify the correlation effect for the 1.84 Å$^{-1}$ (3.4 Å) scattering. Larger bundles are anticipated for the actual composite, which could further enhance the effect.
Figure 19:
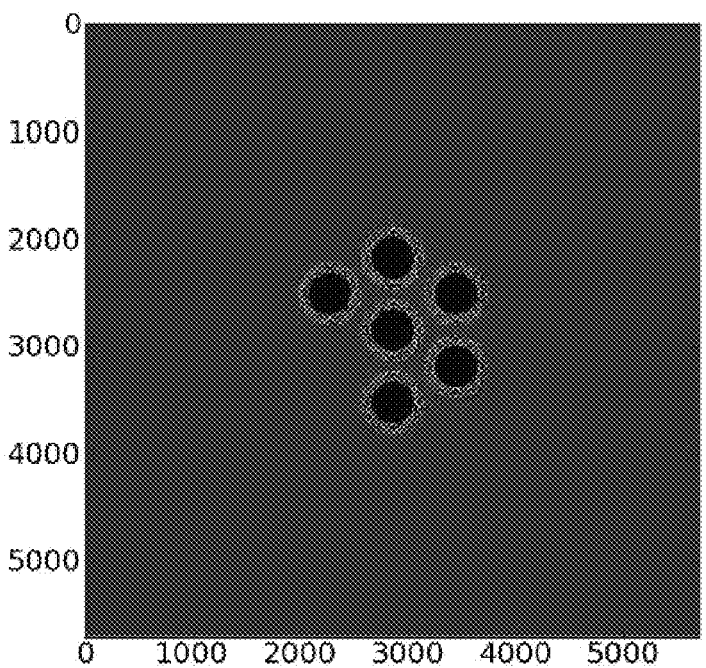
Figure 19:
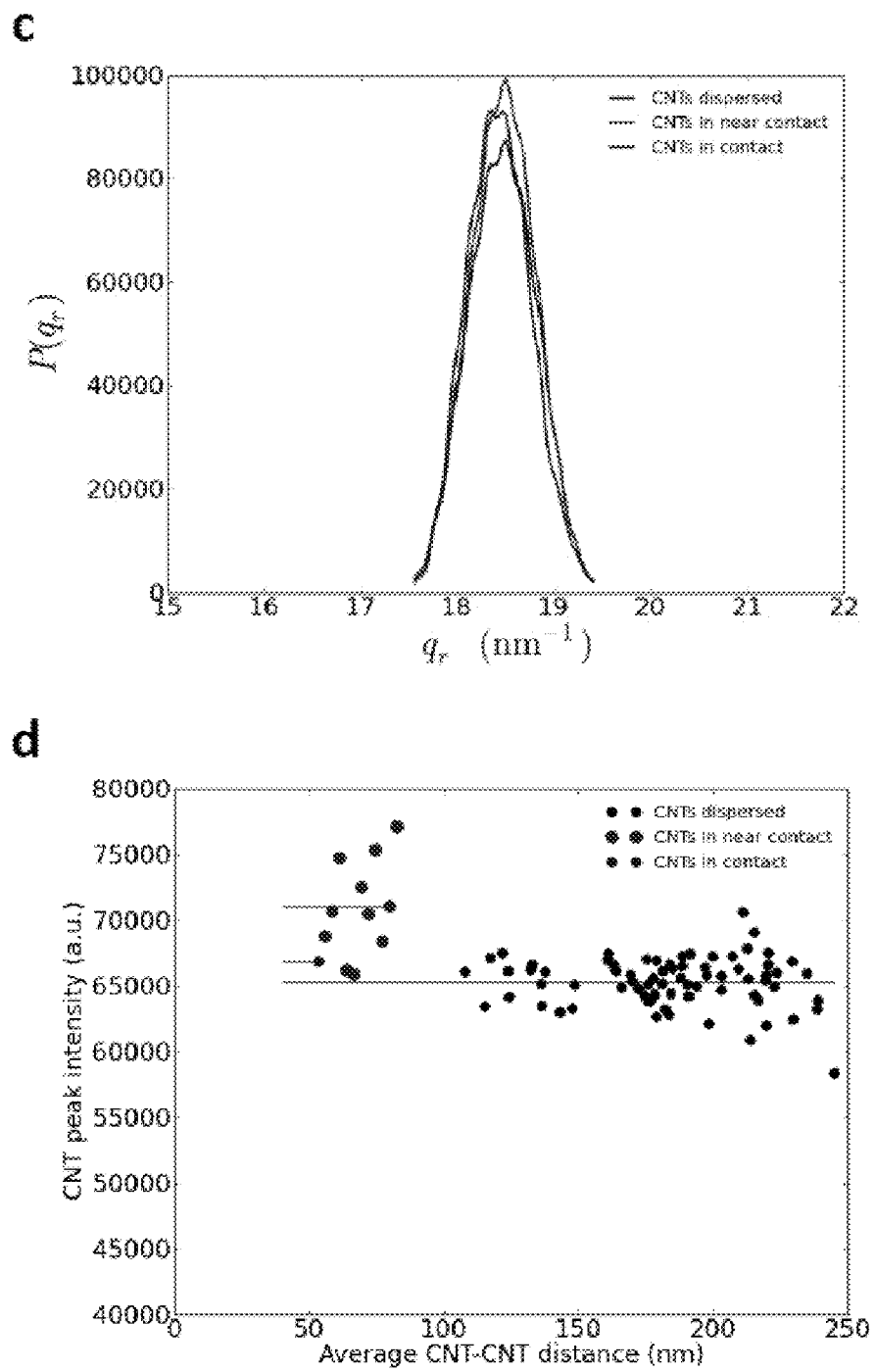

Modeling of WAXS Amplification at 1.84 A$^{-1}$ (FIGS. 18-19)

The MWNT wall spacing of d=0.34 nm leads to a scattering peak at q=2ir/d=1.84 A$^{-1}$ in reciprocal space. Although the intensity of this WAXS scattering peak arises predominantly from the intra-tube layer correlations, Applicants demonstrate that inter-tube interactions or correlations can also affect the scattering intensity. A straightforward model is used wherein a candidate real space electron density distribution is simulated within a finite and discretized simulation box. Applicants use a theoretical scattering-length-density (SLD) for PDMS of SLDPDMS=8.86×10$^{-6}$ A$^{-2}$ for the matrix. The MWNT walls are simulated using concentric rings, which have a Gaussian radial profile, and whose average electron density is matched to that for bulk graphite: SLDMWNT z 18.32×10$^{-6}$ A$^{-2}$. The center of the MWNT is assumed to be empty (0×10$^{-6}$ A$^{-2}$). For simplicity, Applicants model perfectly aligned infinite tubes, in which case a representative 2D cross-section is used to compute the in-plane scattering ($q_r$ direction). The reciprocal-space scattering is computed from the real space electron density distribution using:

$$P(q_r) = \int_0^{2\pi} |F(q_x, q_y)|^2 \, d\phi$$

$$= \int_0^{2\pi} \left|\int \rho(r)e^{iq\cdot r} dV\right|^2 d\phi$$

$$= \int_0^{2\pi} \left|\int_{-\infty}^{+\infty}\int_{-\infty}^{+\infty} \rho(x,y)e^{iq_x x}e^{iq_y y} dx\,dy\right|^2 d\phi$$

$$= \int_0^{2\pi} \left|\int_{-\infty}^{+\infty}\int_{-\infty}^{+\infty} \rho(x,y)e^{iq_r \sin(\phi)x}e^{iq_r \cos(\phi)y} dx\,dy\right|^2 d\phi$$

Under this formula, $F(q_x,q_y)$ is the two-dimensional form-factor for the simulation volume, which is computed by integrating the real space electron density distribution, p(x,y). The outer integral averages over all possible in-plane orientations, P, which adds an assumption of in-plane isotropy and converts the scattering to a one-dimensional profile. The equation was solved numerically for a wide range of MWNT configurations. Specifically, six MWNTs were added to the simulation volume. For some simulations, the MWNTs were intentionally placed in direct contact. In other simulations, a small gap was placed between the MWNTs. Finally, random configurations of the nanotubes were simulated to account for a 'well-dispersed' phase.

The scattering intensity near the peak of interest was summed in order to provide a measure of expected WAXS signal. It was seen that MWNTs in direct (or near) contact had, on average, higher scattering at the peak of interest as compared to the average for 'dispersed' nanotubes. This is to be expected, since MWNTs in direct contact will have constructive correlations between their individual wall-wall scattering, which will enhance the overall signal. In essence, the structure factor for well-associated nanotubes has a maximum near small tube-tube distances. Applicants note that the present simulation likely underestimates the difference between the states, because in all cases the tubes were assumed to be perfectly aligned. In a physical system, tubes in near-contact will have a tendency to align with respect to each other, whereas tubes further apart (i.e. dispersed) will have lower correlation between their orientations. Uncorrelated orientations would be expected to further reduce the intra-nanotube component of the scattering peak.

Without further elaboration, it is believed that one skilled in the art can, using the description herein, utilize the present invention to its fullest extent. The embodiments described herein are to be construed as illustrative and not as constraining the remainder of the disclosure in any way whatsoever. While the preferred embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of strengthening a polymer composite, wherein the method comprises:
    applying a dynamic stress to the polymer composite, wherein the dynamic stress comprises a repeating cyclical stress of at least 100 cycles, and wherein the polymer composite comprises:
        a polymer matrix,
        nanomaterial fillers, and
        an interphase between the polymer matrix and the nanomaterial fillers;
    wherein the applied dynamic stress increases at least one of stiffness or strength of the polymer composite.

2. The method of claim 1, wherein the applied dynamic stress is applied in a direction axial to a direction of nanomaterial filler alignment.

3. The method of claim 1, wherein the applied dynamic stress is applied in a direction radial to a direction of nanomaterial filler alignment.

4. The method of claim 1, wherein the at least one of stiffness or strength of the polymer composite increases by about 5% to about 30%.

5. The method of claim 1, wherein the at least one of the stiffness or strength of the polymer composite continues to increase after a reapplication of the dynamic stress to the polymer composite.

6. The method of claim 1, wherein the relaxation modulus of the polymer composite remains substantially the same after the applying of the dynamic stress to the polymer composite.

7. The method of claim 1, wherein the increase in the at least one of stiffness or strength of the polymer composite is associated with an increase in the storage modulus of the polymer composite.

8. The method of claim 7, wherein the storage modulus increases by about 5% to about 10%.

9. The method of claim 1, wherein the increase in the at least one of stiffness or strength of the polymer composite is associated with a decrease in the loss modulus of the polymer composite.

10. The method of claim 1, wherein the loss modulus decreases by about 5% to about 10%.

11. The method of claim 1, wherein the increase in the at least one of stiffness or strength of the polymer composite is associated with an increase in the storage modulus of the polymer composite, a decrease in the loss modulus of the polymer composite, and a decrease in the loss tangent of the polymer composite.

12. The method of claim 1, wherein the applied dynamic stress results in a rearrangement of the interphase.

13. The method of claim 12, wherein the rearrangement of the interphase comprises a realignment of the polymer matrix at the interphase.

14. The method of claim 12, wherein the rearrangement of the interphase comprises a reduction or elimination of the interphase.

15. The method of claim 1, wherein the applied dynamic stress results in an increase in the thermal expansion of the polymer composite.

16. The method of claim 15, wherein the thermal expansion of the polymer composite increases by about 5% to about 15%.

17. The method of claim 1, wherein the applied dynamic stress results in a homogenization of interparticle chain lengths of polymers within the polymer matrix.

18. The method of claim 17, wherein the homogenization of interparticle chain lengths of the polymers within the polymer matrix results in a more even distribution of the applied dynamic stress within the polymer composite.

19. The method of claim 1, wherein the nanomaterial fillers are non-covalently associated with the polymer matrix.

20. The method of claim 1, wherein the polymer matrix is selected from the group consisting of epoxies, elastomeric polymers, silicone elastomers, polyethylenes, polyacrylates, polyesters, polyurethanes, polyvinyls, polyacrylamides, nylons, polystyrenes, polybutadienes, polypropylenes, polyimides, synthetic rubbers, natural rubbers, and combinations thereof.

21. The method of claim 1, wherein the polymer matrix comprises silicone elastomers.

22. The method of claim 21, wherein the silicone elastomers comprise polysiloxanes.

23. The method of claim 1, wherein the polymer matrix comprises poly(dimethylsiloxane).

24. The method of claim 1, wherein the nanomaterial fillers are selected from the group consisting of single-walled carbon nanotubes, multi-walled carbon nanotubes, double-walled carbon nanotubes, triple-walled carbon nanotubes, few-walled carbon nanotubes, ultra-short carbon nanotubes, graphite, graphene, graphene nanoribbons, carbon black, silica nanoparticles, metal nanoparticles, metal nanofibers, ceramic nanoparticles, ceramic nanofibers, organometallic nanoparticles, organometallic nanofibers, cermet nanoparticles, cermet nanofibers, and combinations thereof.

25. The method of claim 1, wherein the nanomaterial fillers comprise multi-walled carbon nanotubes.

26. The method of claim 1, wherein the applied dynamic stress permanently increases at least one of stiffness or strength of the polymer composite.

27. A method of strengthening a polymer composite, wherein the method comprises:
applying a dynamic stress to the polymer composite, wherein the dynamic stress comprises a repeating cyclical stress of at least 100 cycles, and wherein the polymer composite comprises:
an elastomeric polymer matrix,
carbon nanotubes, and
an interphase between the elastomeric polymer matrix and the carbon nanotubes;
wherein the dynamic stress increases at least one of stiffness or strength of the polymer composite.

28. The method of claim 27, wherein the at least one of stiffness or strength of the polymer composite increases by about 5% to about 30%.

29. The method of claim 27, wherein the increase in the least one of stiffness or strength of the polymer composite is associated with an increase in the storage modulus of the polymer composite, a decrease in the loss modulus of the polymer composite, and a decrease in the loss tangent of the polymer composite.

30. The method of claim 27, wherein the applied dynamic stress results in a rearrangement of the interphase.

31. The method of claim 30, wherein the rearrangement of the interphase comprises a realignment of the elastomeric polymer matrix at the interphase.

32. The method of claim 30, wherein the rearrangement of the interphase comprises a reduction or elimination of the interphase.

33. The method of claim 30, wherein the applied dynamic stress results in an increase in the thermal expansion of the polymer composite.

34. The method of claim 27, wherein the applied dynamic stress results in a homogenization of interparticle chain lengths of polymers within the polymer matrix.

35. The method of claim 34, wherein the homogenization of interparticle chain lengths of the polymers within the polymer matrix results in a more even distribution of the applied dynamic stress within the polymer composite.

36. The method of claim 27, wherein the carbon nanotubes are non-covalently associated with the elastomeric polymer matrix.

37. The method of claim 27, wherein the elastomeric polymer matrix comprises silicone elastomers.

38. The method of claim 37, wherein the silicone elastomers comprise polysiloxanes.

39. The method of claim 27, wherein the elastomeric polymer matrix comprises poly(dimethylsiloxane).

40. The method of claim 27, wherein the carbon nanotubes are selected from the group consisting of single-walled carbon nanotubes, multi-walled carbon nanotubes, double-walled carbon nanotubes, triple-walled carbon nanotubes, few-walled carbon nanotubes, ultra-short carbon nanotubes, and combinations thereof.

41. The method of claim 27, wherein the carbon nanotubes comprise multi-walled carbon nanotubes.

42. The method of claim 27, wherein the applied dynamic stress permanently increases at least one of stiffness or strength of the polymer composite.

* * * * *